US011755445B2

(12) United States Patent
Chen et al.

(10) Patent No.: US 11,755,445 B2
(45) Date of Patent: Sep. 12, 2023

(54) DISTRIBUTED VIRTUAL DATA TANK FOR CROSS SERVICE QUOTA MANAGEMENT

(71) Applicant: Microsoft Technology Licensing, LLC, Redmond, WA (US)

(72) Inventors: Jinghua Chen, Redmond, WA (US); Anatoly Victor Koretsky, San Antonio, TX (US); Srivalli Chavali, Redmond, WA (US); Naresh Sundaram, Redmond, WA (US); Pradeep Kamalakumar, Hyderabad (IN); Steven James Rayson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/329,662

(22) Filed: May 25, 2021

(65) Prior Publication Data
US 2022/0261328 A1 Aug. 18, 2022

(30) Foreign Application Priority Data
Feb. 17, 2021 (IN) .............................. 202141006623

(51) Int. Cl.
G06F 11/30 (2006.01)
G06F 16/93 (2019.01)
(Continued)

(52) U.S. Cl.
CPC ........ *G06F 11/3096* (2013.01); *G06F 16/907* (2019.01); *G06F 16/9017* (2019.01); *G06F 16/9038* (2019.01); *G06F 16/93* (2019.01)

(58) Field of Classification Search
CPC ...... G06F 11/30; G06F 11/3096; G06F 16/13; G06F 16/35; G06F 16/93; G06F 16/901;
(Continued)

(56) References Cited

U.S. PATENT DOCUMENTS 7,885,987 B1 *  2/2011  Lee ...................... G06F 16/93
                                              707/937
9,378,205 B1 *  6/2016  Schmidt ............... G06F 16/28
                      (Continued)

FOREIGN PATENT DOCUMENTS

CN        115203133 A  * 10/2022
WO   WO-2022177665 A1 *  8/2022  .......... G06F 11/3096

OTHER PUBLICATIONS

"API Rest Service ecoDMS Version 16.09", Retrieved from: https://www.ecodms.de/index.php/en/component/jdownloads/?task=download.send&id=129&catid=68&m=0&Itemid=661, Oct. 5, 2020, 27 Pages.

(Continued)

*Primary Examiner* — James N Fiorillo
(74) *Attorney, Agent, or Firm* — Schwegman Lundberg & Woessner, P.A.

(57) ABSTRACT

Disclosed are embodiments that communicate label information for documents between two enterprise computer systems. The two computer systems operate asynchronous from each other, and have limited available resources for use in buffering information passing between them. To that end, traditional API architectures that utilize method calls and return parameters do not operate well in this environment, as a first computer systems resources can become exhausted if a second computer system is able to generate data faster than the first computer system can consume it. The problem is exacerbated if an error is experienced when processing the consumed data, especially if there are no resources available to store the data until the error can be cleared. To solve this problem, the disclosed embodiments provide an ability for a consumer to request that data previously delivered to it be delivered again by the producer, in some embodiments, after a specified time delay.

20 Claims, 12 Drawing Sheets

(51) Int. Cl.
  *G06F 16/901* (2019.01)
  *G06F 16/907* (2019.01)
  *G06F 16/9038* (2019.01)

(58) Field of Classification Search
  CPC .............. G06F 16/907; G06F 16/9017; G06F 16/9038; G06F 40/186; G06F 17/3071; G06F 17/30011; G06F 17/30631; G06F 17/30864; G06K 9/00456; G06K 9/00469; H04N 1/4486; H04N 1/00209; H04N 1/32128; G06N 99/005
  USPC ...................................................... 709/224
  See application file for complete search history.

(56) References Cited

U.S. PATENT DOCUMENTS

| | | | | |
|---|---|---|---|---|
| 9,846,771 | B2* | 12/2017 | Gaddipati | G06F 21/31 |
| 10,057,378 | B2* | 8/2018 | Kosim-Satyaputra | H04L 67/2876 |
| 10,178,046 | B1* | 1/2019 | Murugesan | H04L 41/00 |
| 10,694,003 | B2* | 6/2020 | Taneja | H04L 69/16 |
| 10,990,629 | B2* | 4/2021 | Kamath | G06F 16/907 |
| 11,526,514 | B2* | 12/2022 | Fox | G06F 16/27 |
| 2002/0111960 | A1* | 8/2002 | Irons | H04N 1/2166 |
| 2004/0078776 | A1* | 4/2004 | Moon | G06Q 40/08 717/113 |
| 2006/0031220 | A1* | 2/2006 | Newbold | G06F 16/9535 |
| 2006/0143563 | A1* | 6/2006 | Sauermann | G06F 40/103 715/275 |
| 2007/0089053 | A1* | 4/2007 | Uhlig | G06K 15/181 715/255 |
| 2007/0157288 | A1* | 7/2007 | Lim | H04L 63/105 726/1 |
| 2007/0255728 | A1* | 11/2007 | Abate | G06F 16/381 707/E17.096 |
| 2008/0049264 | A1* | 2/2008 | Morimoto | G06V 30/18 358/464 |
| 2008/0060051 | A1* | 3/2008 | Lim | G06F 16/93 726/1 |
| 2008/0127304 | A1* | 5/2008 | Ginter | H04N 21/454 726/2 |
| 2008/0168135 | A1* | 7/2008 | Redlich | G06F 16/282 709/204 |
| 2008/0189598 | A1* | 8/2008 | Yoshida | G03G 21/02 715/227 |
| 2010/0042625 | A1* | 2/2010 | Zoellner | G06F 16/16 707/748 |
| 2010/0106729 | A1* | 4/2010 | Pan | G06F 16/951 707/E17.014 |
| 2012/0297277 | A1* | 11/2012 | King | G06F 16/316 715/201 |
| 2014/0101540 | A1* | 4/2014 | King | G06F 40/143 715/255 |
| 2015/0095352 | A1* | 4/2015 | Lacey | G06F 21/6218 707/752 |
| 2015/0220539 | A1* | 8/2015 | Lambert | G06F 16/355 707/723 |
| 2016/0078364 | A1* | 3/2016 | Chiu | G06F 16/3338 706/11 |
| 2017/0052997 | A1* | 2/2017 | Eisner | G06F 16/22 |
| 2017/0060986 | A1* | 3/2017 | Ideses | G06F 16/355 |
| 2017/0132463 | A1* | 5/2017 | Bastide | G06F 18/2323 |
| 2017/0236130 | A1* | 8/2017 | Kee | G06F 16/93 705/7.26 |
| 2018/0300323 | A1* | 10/2018 | Lee | G06F 16/353 |
| 2019/0319987 | A1* | 10/2019 | Levy | H04L 41/20 |
| 2020/0177556 | A1* | 6/2020 | Subbarayan | G06N 20/00 |
| 2020/0310698 | A1* | 10/2020 | Gardner | G06F 3/1261 |
| 2020/0382677 | A1* | 12/2020 | Chen | H04N 1/00209 |
| 2021/0056075 | A1* | 2/2021 | Thomsen | G06F 16/137 |
| 2021/0406914 | A1* | 12/2021 | Bowers | G06Q 30/016 |
| 2022/0012750 | A1* | 1/2022 | Bowers | G06F 21/31 |
| 2022/0067320 | A1* | 3/2022 | Zakharov | G06F 16/93 |
| 2022/0123935 | A1* | 4/2022 | Baessler | G06F 16/907 |
| 2022/0222284 | A1* | 7/2022 | Sahoo | G06F 16/35 |

OTHER PUBLICATIONS

Andersen, Johanne, "API 101: Lowering the load with pagination", Retrieved from: https://medium.com/@JohanneA/api-101-lowering-the-load-with-pagination-969e5e00cd08, Nov. 10, 2019, 6 Pages.

"International Search Report and Written opinion Issued in PCT Application No. PCT/US22/011885", dated Apr. 11, 2022, 13 Pages.

"Amazon Simple Queue Service", Retrieved from: https://web.archive.org/web/20201001025550/https://docs.aws.amazon.com/AWSSimpleQueueService/latest/SQSDeveloperGuide/sqs-dg.pdf, Oct. 1, 2020, 181 Pages.

"Capping API Usage", Retrieved from: https://web.archive.org/web/20201112033748/https://cloud.google.com/apis/docs/capping-api-usage, Nov. 12, 2020, 2 Pages.

"Fusion Middleware Tuning Performance of Oracle WebLogic Server 12.1.3", Retrieved from: https://web.archive.org/web/20161021154106if_/https://docs.oracle.com/middleware/1213/wls/PERFM/jmstuning.htm#PERFM311, Oct. 21, 2016, 36 Pages.

"How to Avoid Having "Quota Exceeded for 'ReadGroup'" Error in Google Api", Retrieved from: https://web.archive.org/web/20201010175136/https://stackoverflow.com/questions/56987347/how-to-avoid-having-quota-exceeded-for-readgroup-error-in-google-api, Oct. 10, 2020, 4 Pages.

"Limits and Quotas on API Requests", Retrieved from: https://web.archive.org/web/20201027020521/https:/developers.google.com/analytics/devguides/reporting/metadata/v3/limits-quotas, Oct. 27, 2020, 3 Pages.

"Low Disk Watermark Exceeded on", Stackoverflow.com, Retrieved from: https://web.archive.org/web/20201030112549/https:/stackoverflow.com/questions/33369955/low-disk-watermark-exceeded-on, Oct. 30, 2020, 6 pages.

"Memory Queue Connector", Retrieved from: https://www.ibm.com/support/knowledgecenter/SSCQGF_7.1.1/com.ibm.IBMDI.doc_7.1.1/referenceguide48.htm#memqueueconnconf, Retrieved Date: Jan. 4, 2021, 5 Pages.

"Throttling: Limits to How Often you can Submit Requests", Retrieved from: https://web.archive.org/web/20200217182039/https:/docs.developer.amazonservices.com/en_DE/dev_guide/DG_Throttling.html, Feb. 17, 2020, 2 Pages.

Gautam, Natarajan, "Buffered and Unbuffered Leaky Bucket Policing: Guaranteeing QoS, Design and Admission Control", In Journal of Telecommunication Systems, vol. 21, issue 1, Sep. 2002, pp. 35-63.

Tinca, Loan, "The Evolution of the Producer-Consumer Problem in Java", Retrieved from: https://web.archive.org/web/20181009073025/https://dzone.com/articles/the-evolution-of-producer-consumer-problem-in-java, Oct. 9, 2018, 7 Pages.

Vinogradsky, et al., "Advanced Request Throttling with Azure API Management", Retrieved from: https://docs.microsoft.com/en-us/azure/api-management/api-management-sample-flexible-throttling#client-driven-throttling, Feb. 3, 2018, 5 Pages.

* cited by examiner

DISTRIBUTED VIRTUAL DATA TANK FOR CROSS SERVICE QUOTA MANAGEMENT

CLAIM OF PRIORITY

The present patent application claims the priority benefit of the filing date of Indian Application No. 202141006623 filed Feb. 17, 2021, the entire content of which is incorporated herein by reference.

BACKGROUND

Demands on Enterprise document management solutions continue to increase. Cloud computing has enabled cost saving with respect to computer hardware and management by leveraging a pool of computing resources across an ever growing pool of users. As demands on highly leveraged hardware and software has increased, a need for efficient coordination of coordinate data flow between enterprise computing components has also increased. If one enterprise computing component generates more data than a second enterprise computing component is able to process, efficiency can be reduced. In some cases, data is lost when the slower first component is unable to store data produced by a second component. Thus, improved methods of communication between enterprise computing components is needed.

DETAILED DESCRIPTION

Figure 1:
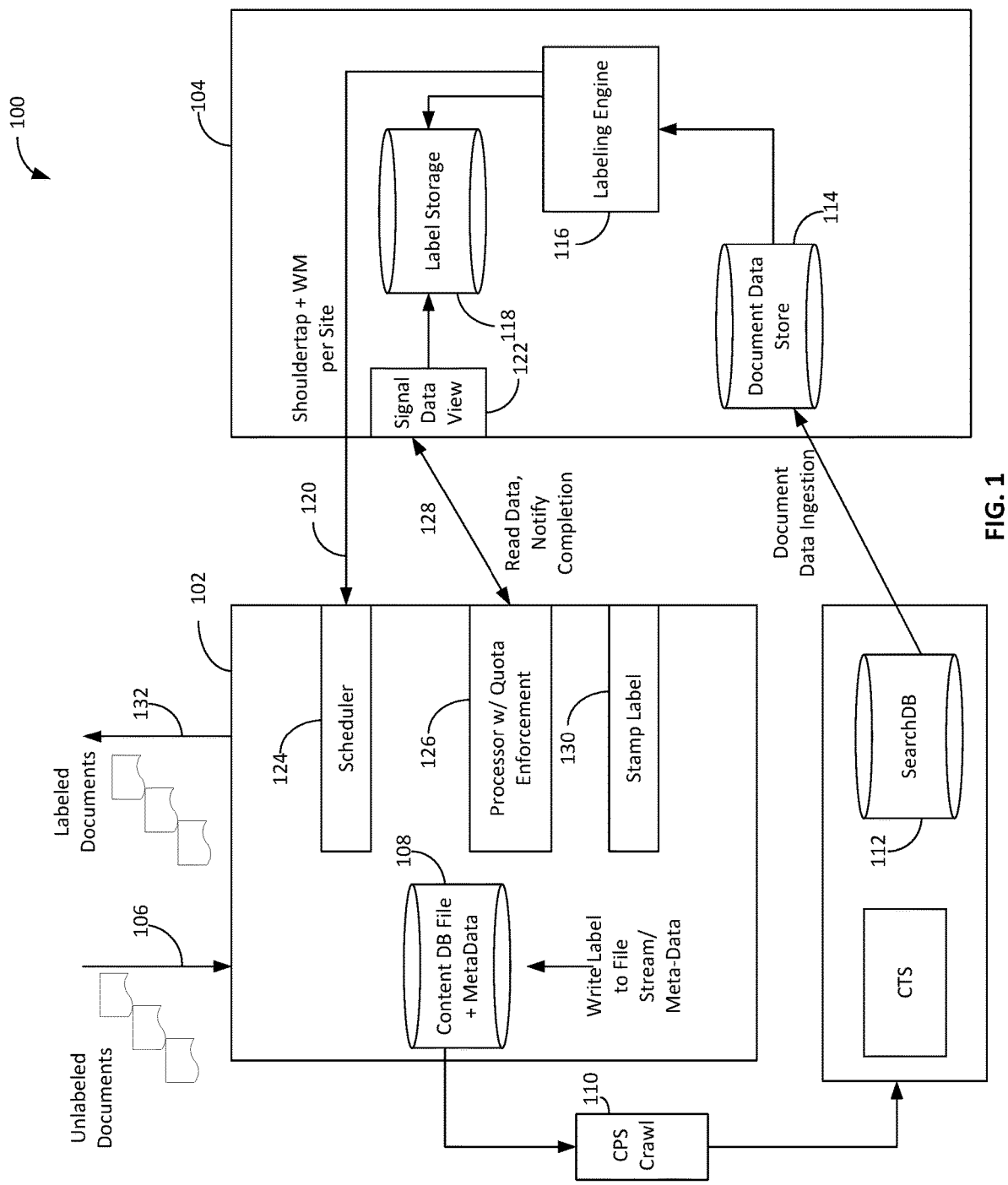
FIG. 1 is an overview diagram showing operation of a document labeling system implementing one or more of the disclosed embodiments.

Enterprise systems are highly leveraged across large user communities and are required to process very large amounts of data reliably and cost effectively. In many modern computer architectures, processing tasks are distributed across multiple physical computers. These distributed architectures pass data between processes that operate asynchronously with respect to each other. Therefore, data flow between these processes is carefully managed to ensure efficient resource usage on both sides of the data flow. The disclosed embodiments provide for an implementation that manages data flow between two enterprise data processing tasks. Furthermore, these embodiments also support an error recovery model that minimizes a need for a consumer in the data flow to buffer or otherwise allocate large amounts of storage space to incoming data.

In some embodiments, data is processed by a first computer system operating as a producer. The data is delivered to a second computer system operating as a consumer. For example, in some embodiments, the producer analyzes documents and then generates labels for the documents, which are obtained from the consumer. The labels characterize contents of the documents, for example, indicating the document includes confidential information, or less sensitive information, for example.

Before the data (e.g. documents in the example above) can be processed by the producer, input data is first made available by the consumer (e.g. a first enterprise system) to the producer (e.g. a second enterprise system). The second enterprise system fetches or otherwise retrieves the input data from a data storage hosted or managed by the first enterprise system. This data fetching can be performed at a pace defined by the second enterprise system, and therefore the second enterprise system can ensure its own internal storage and processing resources are not overwhelmed by the data. The first enterprise system cannot predict a consumption rate of the data by the second enterprise system, and thus stores the input data to be processed in a storage system that is relatively inexpensive and large. Large stable storage devices running enterprise data storage are used in some embodiments. For example, document processing systems, such as Microsoft® SharePoint®, can be configured to store documents in large stable storage devices, using enterprise datastores such as Microsoft® SQL Server®, or Azure® Cloud Storage®, at a relatively low cost.

In some embodiments, the data is indexed to provide for performance improvements when fetched by the producer, or second enterprise system. Once the data is fetched, the second enterprise system performs its respective processing. In some embodiments, the processing determines labels of documents defined by the fetched data. In some embodiments, a label characterizes content of a document. For example, some documents that are determined to include personally identifiable information (PII), may be labeled private, other documents are labeled "public" when no PII is detected. Alternatively, in some embodiments, particular keywords are used to identify, for example, proprietary information. In some embodiments, if particular keywords or phrases are found in a document, the document is labeled "confidential," or "top secret," or given other labels depending on which keywords, phrases, or other indicators of the nature of the document contents are found.

Once the labels are determined by the producer (second enterprise system), they are made available to the consumer as results of the processing performed by the producer. In some embodiments, the producer generates a "shoulder tap" message, notifying the consumer there is data (e.g. document labels) available for delivery. Some embodiments send this notification only when transitioning from a state where no data is available for the consumer, to a state where some data is available for retrieval by the consumer (e.g. a delivery queue of the producer transitions from an "empty" state to a "non-empty" state.

To manage the consumer's internal resources, the consumer is able to specify a maximum amount of data requested from the producer. Thus, with this approach, the consumer can limit, for example, an amount of memory allocated to storing the produced results. In some embodiments, document labels are retrieved as results from the producer.

Some of the disclosed embodiments contemplate the sharing of "watermark" information between the producer and consumer. The disclosed watermark indicates a location in the producers delivery queue from which a next set of results are taken in order to provide to the consumer. Thus, with every data consumption by the consumer, the watermark "advances" logically. When data is obtained from the producer, the producer also provides a current watermark. The next time the consumer requests more information, it provides the watermark obtained from the producer. This allows the producer and consumer to stay in sync with respect to which entries of the producer's delivery queue are to be obtained.

In some cases, the consumer encounters an error while processing the results provided by the producer. For example, in some embodiments, after a consumer retrieves one or more document labels from the producer, an error occurs while the consumer is attempting to stamp a document with one of the retrieved labels. In some embodiments, stamping a document with a label makes use of multiple different enterprise resources, the unavailability or latency of any of which can cause the label stamping process to fail. This problem is exacerbated, in some embodiments, by an inability of the consumer to store the label that was associated with the failure until the labeling operation can be retried. For example, when an enterprise component necessary to perform the stamping is unavailable for an extended period, the consumer is unable to store the label information for that period, at least in some contemplated enterprise configurations. Thus, the consumer is forced, in some cases, to drop or otherwise fails to store the label information for the document that experienced the failure. Without a properly labeled document, the consumer would be forced to either not label the document, or post the document for retrieval by the producer a second time. When the producer retrieved the document for the second time, it would repeat the labeling process previously performed on the document, thus wasting compute resources on the producer side.

To solve the technical problem associated with the difficulty of providing long term storage of intermedia results, (e.g., document labels that were unable to be successfully stamped on a document), the disclosed embodiments provide a mechanism for the consumer to request that the producer produce the same results (e.g., same label for a document) at least a second time. To that end, in some embodiments, the consumer also specifies a time delay, before which the requested result should not be produced. Thus, for example, if the consumer experiences a failure processing results that it expects to last one hour, the consumer can indicate to the producer that the data is to be produced a second time, but not for at least one hour. Thus, with this approach, the consumer is able to leverage storage resources at the producer, and avoid allocating those resources on the consumer side. The resources on the consumer side can also disregard any resources that would also be necessary to handle expected failure situations, where the consumer is unable to process at least some result data for a period of time.

To provide this retry capability, some embodiments of the producer implement a list or queue structure. As data is processed, it is made available for delivery to the consumer by placing it on the queue or list. Along with the processed data, and identifier of data associated with the result is also included in the queue or list. The identifier allows the consumer to correlate result data delivered by the producer with data originally fetched by the producer from the consumer, at least in some embodiments. Data on the queue or list also has a delay value or otherwise indicates a time after which the data can be delivered to the consumer. By default, the delay or time value indicates there is no limit on when the result data (e.g., document label data) can be delivered.

In some embodiments, when the producer receives a retry request from the consumer, the retry request indicates a data or document identifier of data (e.g. a document) the consumer requests that the producer provide to the consumer for at least a second time. Using the supplied document identifier, the producer is able to locate the previously produced data in its queue or list structure. The producer can indicate that the data should be re-queued so as to be provided to the consumer (e.g. again), and a time at which providing the data is allowable. When the consumer requests data, the producer consults the time information for each result data, that is also indicated for production to the consumer, to determine whether it is eligible for production to the consumer. Thus, the disclosed embodiments allow the consumer to closely manage an amount of storage and processing allocated to results provided by the consumer, and to minimize a need to provide additional resources for processing error conditions it may encounter. While the description above is focused on the communication of label information from a labeling system to a document processing system, the techniques of this disclosure can be applied within other data communication contexts to ensure proper flow control between a producer of data and a consumer of data, for example, to communicate other types of data besides document labels.

FIG. 1 is an overview diagram showing operation of a document labeling system 100 implementing one or more of the disclosed embodiments. The document labeling system 100 includes a document processing system 102 and a labeling system 104. The document processing system 102 receives unlabeled documents 106.

The unlabeled documents are stored in a content database 108. The content database 108 is indexed via an indexing process 110 to generate an indexed search database 112. The labeling system 104 ingests document data from the indexed search database 112 into a document data store 114. A labeling engine 116 reads the document data and determines an appropriate label for the document. The label information for the document is stored, temporarily, in a label data store 118. Upon obtaining the label information, the labeling system 104 signals the document processing system 102 via a message 120 that label information is available.

The document processing system 102 is then able to retrieve the label information stored in the label data store 118 via a signal view module 122 of the labeling system 104. The message 120 is received by a scheduler 124 of the document processing system 102. The scheduler 124 initiates retrieval of labeling information from the labeling system 104 in a manner that ensures the retrieved information fits within the memory resources available at the document processing system 102. Thus, the rate of information transfer allows the document processing system 102 to properly process the labeling information without exceeding any resource constraints within the document processing system 102.

Some embodiments utilize a "watermark" to communicate which information has been communicated from the labeling system 104 to the document processing system 102, and which information has not. In some embodiments, a watermark indicates a position within a queue or list of the labeling system 104. The position is a position from which additional label information is obtained and then transferred to the document processing system 102. To retrieve labeling information, the document processing system 102 provides a watermark indicator to the labeling system 104 via message 128. The watermark indicator indicates, to the labeling system 104 from which location within the label data store 118 the labeling information is to be retrieved. After providing the labeling information to the document processing system 102, the labeling system 104 provides an updated watermark indicator, which can be used by a subsequent retrieval of labeling information by the document processing system.

The document processing system 102 stores the retrieved labeling information with the documents for which the labels pertain. For example, in some embodiments, a document stamping component 130 writes the label of a document to metadata of the document. The document and its metadata are stored in the content database 108. After a document is labeled, the document processing system 102 provides it via data flow 132.

Figure 2:
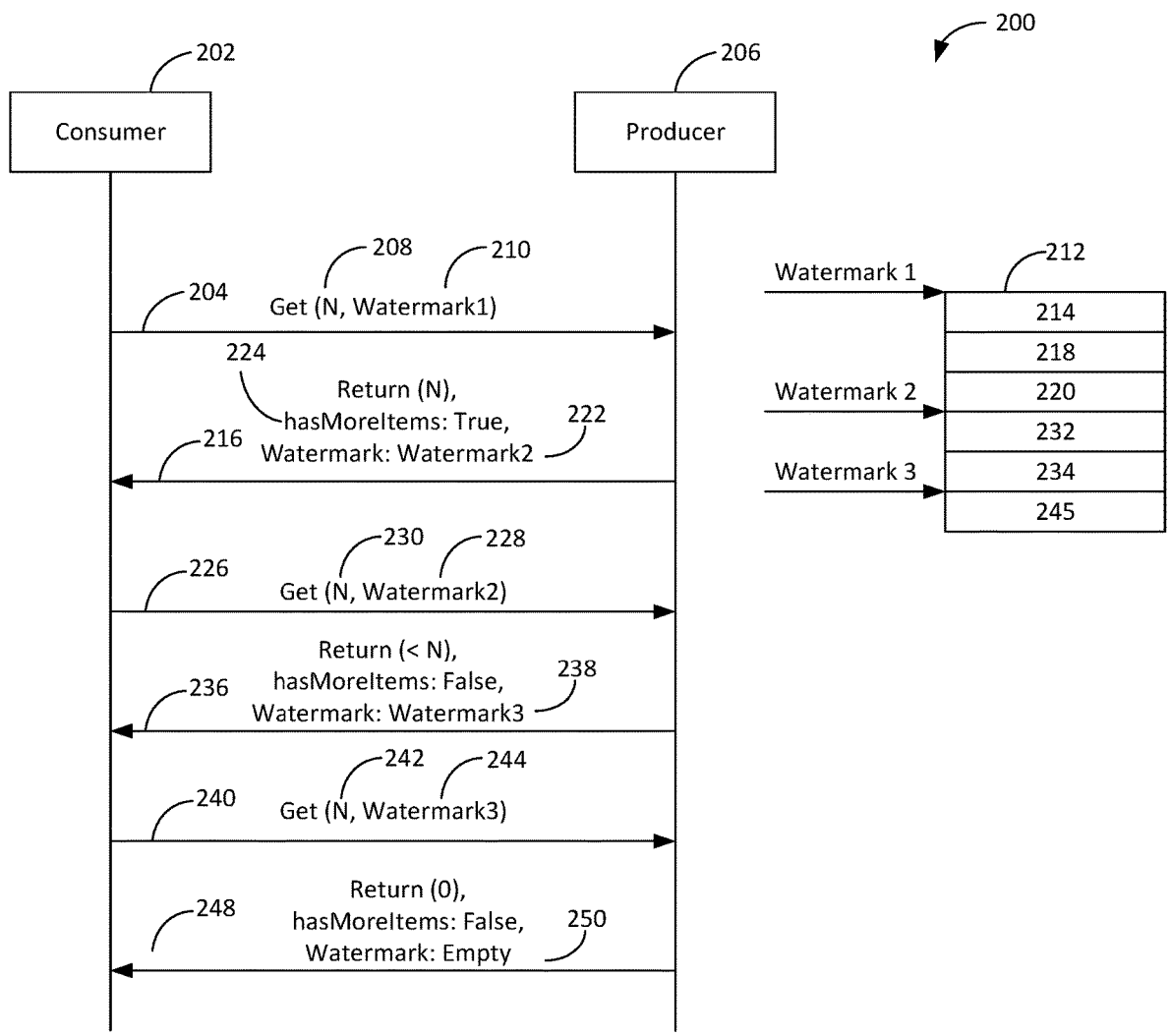
FIG. 2 shows an example communication sequence between a produce and a consumer.

FIG. 2 shows an example communication sequence between a produce and a consumer. The message sequence 200 shows that a consumer 202 generates a first get request message 204 to the producer 206. The first get request message 204 indicates a maximum number of items 208 to be obtained, and a watermark indicator 210. Note that while the first get request message 204 includes a watermark indicator 210, the illustration of FIG. 2 assumes that the consumer 202 either received a prior indication of an appropriate watermark to reference the queue or list 212 of the producer, or designates a predefined initial value for the watermark indicator 210 during a first communication with the producer 206.

By specifying the maximum number of items, the consumer is able to regulate how much data it is required to store. In other words, the consumer can implement a data quota that it can avoid exceeding. The watermark indicator 210 identifies a position within a first in, first out queuing structure maintained by the producer 206. An example queue or list 212 is shown. The first get request message 204 indicates a watermark indicator "Watermark1" which identifies the data 214.

In response to the first get request message 204, the producer returns to the consumer 202, via a response message 216, entries available in the queue or list 212 up to a number of entries specified by the maximum number of items 208. For example, for purposes of this example explanation, the maximum number of items 208 specified three (3) items, and thus the response message 216 returns data 214, the data 218, and the data 220. As a result of returning the three queue entries, including the data 214, the data 218, and the data 220, the producer 206 returns a second watermark indication 222 as "Watermark 2" in the response message 216. FIG. 2 also shows that the response message 216 further indicates whether the queue or list 212 is empty or not via indication 224.

When the consumer 202 is ready to consume additional data, the consumer 202 generates a second get request message 226. The consumer 202 includes the second watermark indication 222 as a parameter 228 with the second get request message 226. The second get request message 226 also specifies a maximum number (or size) of data items to retrieve via a parameter 230.

Upon receiving the second get request message 226, the producer 206 references the provided watermark parameter 228 to fetch data 232 and data 234 from the queue or list 212 and return the data entries to the consumer 202 via a response message 236. The producer 206 provides a third watermark indicator 238 in the response message 236 based on the providing of the data 232 and the data 234 to the consumer 202.

When the consumer 202 is available to receive additional data, the consumer 202 issues a third get request message 240, with the third get request message 240 indicating the third watermark as parameter 244 that has an equivalent value to the third watermark indicator 238 that was provided to the consumer in the response message 236. The third get request message 240 also indicates a maximum data 242 to be obtained. Upon receiving the third get request message 240, the producer 206 provides the data 245 from the queue or list 212 in a response message 248. The producer also indicates the queue or list 212 is empty via a fourth watermark indicator 250.

Thus, the message sequence 200 of FIG. 2 provides a method of a consumer of data to regulate delivery of data in a manner that prevent overflow of the consumers resources, while also providing efficiencies by allowing the producer 206 to provide multiple data entries to the consumer 202 when appropriate. This reduces a number of messages exchanged between the consumer and producer and thus improves efficiency.

Figure 3:
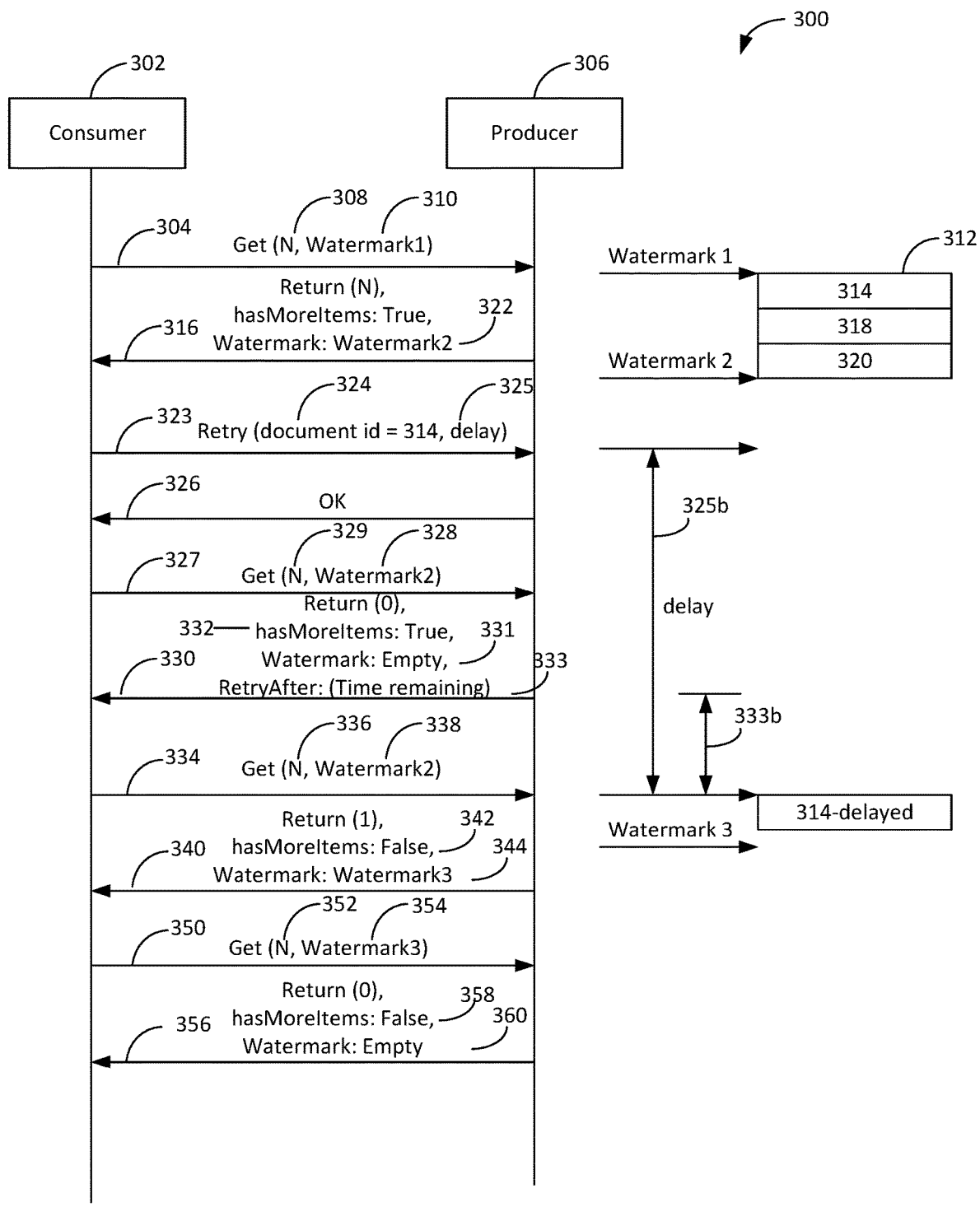
FIG. 3 shows an example communication sequence between a produce and a consumer.

FIG. 3 shows an example communication sequence 300 between a produce and a consumer. The communication sequence 300 shows that a consumer 302 generates a get request 304 to the producer 306. The get request 304 indicates a maximum number of items 308 to be obtained, and a watermark indicator 310. By specifying the maximum number of items, the consumer is able to regulate how much data it is required to store. In other words, the consumer can implement a data quota that it can avoid exceeding. The watermark indicator 310 identifies a position within a first in, first out queuing structure maintained by the producer 306. An example queue or list 312 is shown. The get request 304 indicates a watermark indicator "Watermark1" which identifies the data 314.

In response to the get request 304, the producer returns to the consumer 302, via a response message 316, entries available in the queue or list 312 up to a number of entries specified by the maximum number of items 308. For example, for purposes of this example explanation, the maximum number of items 308 specified three (3) data items, and thus the response message 316 returns data for data 314, data 318, and data 320. As a result of returning the data 314, data 318, and data 320, the producer 306 returns a second watermark indication 322 as "Watermark 2" in the response message 316. FIG. 3 also shows that the response message 316 further indicates whether the queue or list 312 is empty or not via indication 324.

When processing any one of the data 314, data 318, or data 320, the consumer 302 can experience an error. As illustrated in FIG. 3, in response to such an error, the consumer 302 generates a retry request message 323. The retry request message 323 identifies, via a data identifier 324, data that it will retrieve after a delay of at least a time period indicated by a delay parameter 325. The amount of the delay specified by delay parameter 325 is shown by the delay 325b. As shown in FIG. 3, the retry request message 323 indicates that data 314 is being re-requested. The producer 306 confirms the retry request message 323 via a retry confirmation message 326. FIG. 3 shows that the producer 306, in response to the retry message, stores information indicating that the data 314 is to be made available after the delay specified by the delay parameter 325.

The consumer 302 then generates a second get request message 327. The consumer 302 includes the second watermark indication 328 with the second get request message 327. The second get request message 327 also specifies a maximum number of data items 329 to retrieve.

Upon receiving the second get request message 327, the producer 306 references the queue or list 312 and determines there are no data available in the queue for the given time. Thus, the producer 306 thus indicates in a get response message 330 that the queue or list 312 is empty via a watermark indicator 331. However, the get response message 330 indicates the producer does have more item via the hasMoreItems field 332. The get response message 330 further indicates that additional retry data is available after a delay indicated by the retry after a time remaining indicator 333. Time delay 333b graphically illustrates an example value of a time remaining indicator 333 for the get response message 330. Thus, in some embodiments, the consumer 302 then sets a timer for an amount of time indicated by the time remaining indicator 333. When the timer expires, the consumer 302 generates a third get request message 334, including a maximum data indicator 336 and a watermark indicator 338. Note that the consumer 302 passes a watermark indicator 338 equivalent to the watermark indicator provided in the second get request message 327, and provided by the producer in the response message 316.

In response to the third get request message 334, the producer 306 provides a response message 340 providing the data 314 (which is a second delivery of the data 314 to the consumer). The producer also indicates the queue is empty via indicator 342, and provides an updated watermark indicator 344.

The consumer 302 generates a fourth get request message 350, specifying a maximum number of data items 352 and the previously provided watermark 354. As the queue or list 312 is empty, the producer 306 generates a response message 356 indicating the queue is empty via a first indicator 358 and second indicator 360.

Note that while the illustration of FIG. 3 shows the queue is empty between delivery of data 320 and the data 314, in other embodiments, other data can be delivered between the retry request message 323 and delivery of the data 314 in get response message 340. For example, data could be preexisting in the queue or list 312 after watermark 2 when the retry message is issued/received, or data could arrive in the queue or list 312 subsequent to the retry request message 323 but before the delay has expired. In this case, for example, the get response message 330 might have delivered additional data instead of returning the empty indication.

Figure 4:
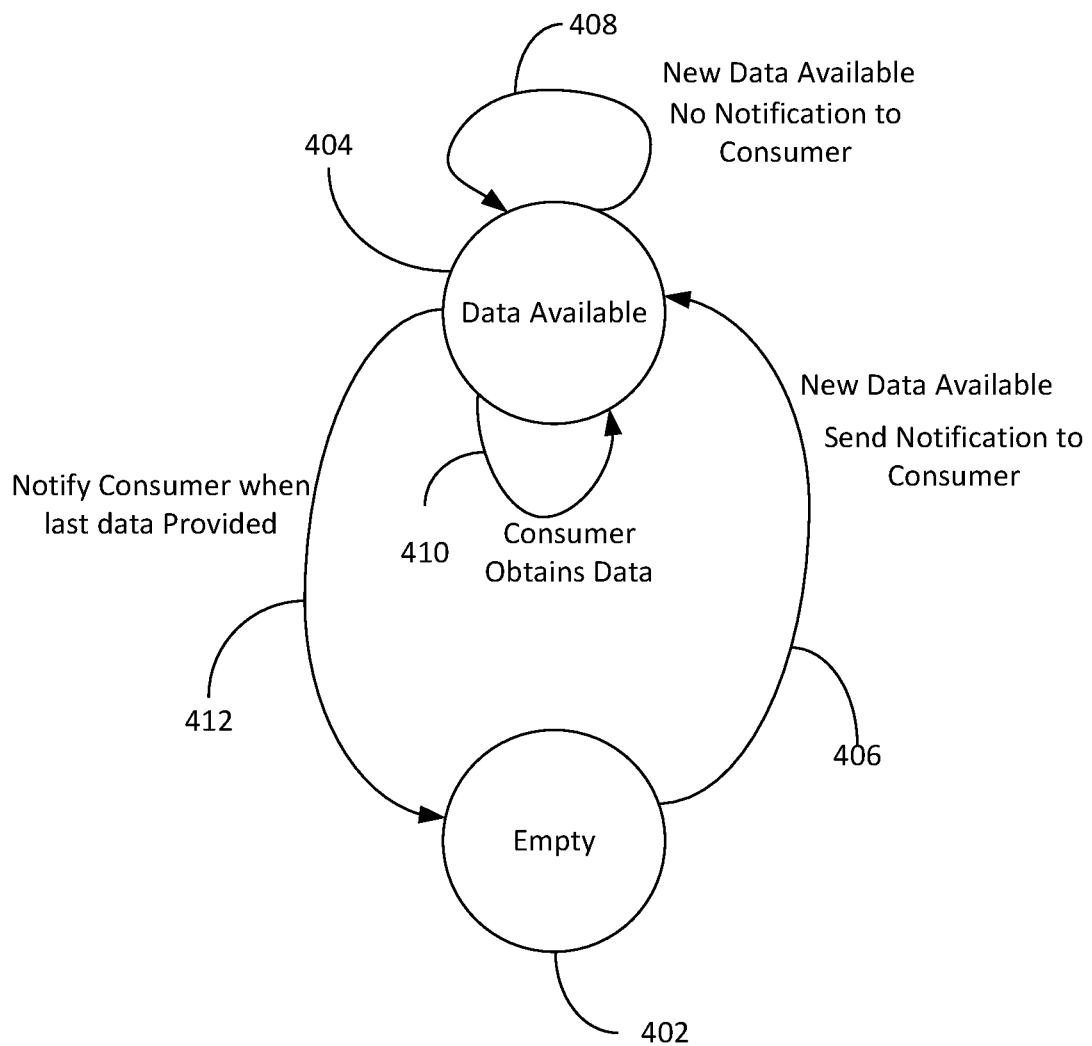
FIG. 4 is a state machine diagram illustrating states and transitions between states that are implemented in one or more of the disclosed embodiments.

FIG. 4 is a state machine diagram illustrating states and transitions between states that are implemented in one or more of the disclosed embodiments. FIG. 4 shows two states, an empty state 402 and a data available state 404. The empty state 402 represents a condition when there is no data available to exchange between a consumer and a producer. In other words, the consumer (e.g. consumer 202 or consumer 302) has retrieved all existing data from a producer (e.g. producer 206 or producer 306). The data available state 404 represents a condition where the producer has generated data that has not yet been delivered to the consumer. FIG. 4 shows a transition 406 from the empty state 402 to the data available state 404. The transition 406 occurs in at least two circumstances in some embodiments. A first circumstances is when the labeling system 104 completes a labeling operation for a document. When the label is available, it is added to a queue, in at least some embodiments, for production to a consumer when the consumer asks for data. A second circumstance is when previously produced data has been requested, by the consumer, to be retried (e.g. via the retry request message 323 discussed above, and/or the retry message 920 discussed below with respect to FIG. 9.

When some of the disclosed embodiments transition from the empty state 402 to the data available state 404, a notification is sent to the consumer indicating that new data is available. An example notification that occurs when transitioning from the empty state 402 to the data available state 404 is discussed above with respect to message 120. FIG. 4 shows that additional data 408 is received while in the data available state 404. Because the implementation is already in the data available state 404, the additional data 408 does not cause a state transition. No further notifications are sent to the client as a result of the additional data 408 being available.

FIG. 4 also shows a transition 410 that occurs when the producer delivers data to the consumer, but more data remains at the producer. FIG. 4 also shows a transition 412 that occurs when a last data available at the producer is delivered to the consumer. The transition 412 results in the implementation moving from the data available state 404 back to the empty state 402. In some embodiments, when the last data available is provided to a consumer, the consumer is also notified that no further data is available, for example, as discussed above with respect to FIGS. 2-3 (e.g., the "hasMoreItems" parameter).

Figure 5:
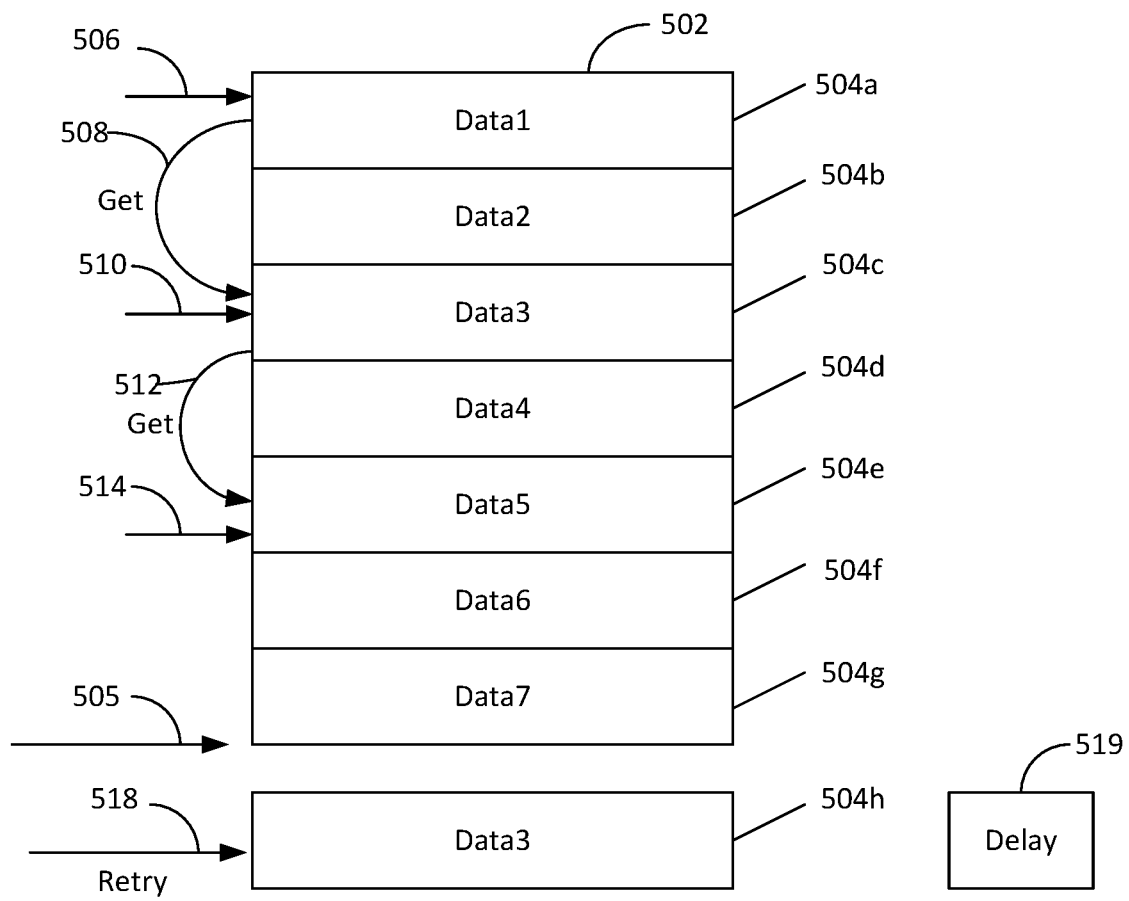
FIG. 5 illustrates data flow of get operations from a queue data structure that is implemented in one or more of the disclosed embodiments

FIG. 5 illustrates data flow of get operations from a queue data structure that is implemented in one or more of the disclosed embodiments. FIG. 5 shows a plurality of data items in a queue or list 502. The data items include data 504a-h. The queue or list 502 is implemented as a first in, first out (FIFO) queue in at least some embodiments. Thus, for example, the data 504a-g are inserted in an order starting at the top of FIG. 5 and moving toward progressively lower data items. Thus, data 504a is inserted first, then data 504b, then data 504c, and eventually, data 504g. Retrieval of data items from the queue or list 502 occurs in a similar order. In other words, data 504a is retrieved first, then data 504b, then data 504c, and eventually, data item 504g. FIG. 5 also shows a next insertion pointer 505, which denotes a location that a new data item, that does not have any time deliver constraints, will be inserted into the queue or list 502 with respect to the other data 504a-g.

FIG. 5 shows a first watermark 506. The first watermark 506 denotes a data item in the queue or list 502 that is to be retrieved next by a consumer. Thus, when a get request 508 is received from a consumer, a producer retrieves at least the data 504a to satisfy the get request. FIG. 5 demonstrates that multiple data items are obtained, in some circumstances via a single get request. For example, FIG. 5 shows the data 504a and 504b being delivered by a producer to a consumer as part of the get request 508. The get request 508 results in an updated second watermark 510, denoting a next data item to be delivered to the consumer (e.g. data 504c).

A second get request 512 is shown, which results in a producer delivering data items 504c and 504d to the consumer. An updated third watermark 514 results from the second get request 512 and subsequent deliver of data.

FIG. 5 also shows results of a retry request 518 invoked by a consumer. The retry request 518 indicates that a consumer requests that the producer deliver the "data3", shown in FIG. 5 as data 504c, at least a second time. The retry request 518 also indicates a time delay before the data "data 3" should be re-delivered to the consumer. In response to the retry request 518, the producer adds data 504h to the queue or list 502 Associated with the data 504h is a delay value 519. In some embodiments, the delay value 519 is consistent with the delivery time field 718 discussed below, and indicates either a delay before the data 504h can be delivered to the consumer, or an absolute time value, after which the data 504h can be delivered. Note that if new data arrives for delivery, that data, assuming there are no delivery time constraints on the new data, will be added at a position of the next insertion pointer 505, before the data 504h in the queue. If the delay value 519 reaches zero, or otherwise indicates that the data 504h has no more time based delivery constraints, the next insertion points 505 will move to indicate a position in the queue or list 502 after the data 504h, at least in some embodiments.

Figure 6:
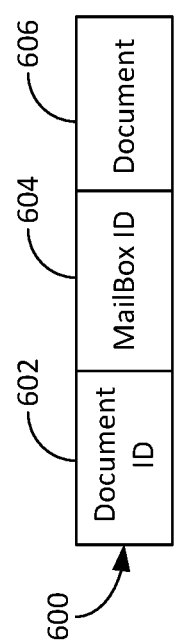
FIG. 6 illustrates example data structures that are implemented in one or more of the disclosed embodiments.

FIG. 6 illustrates example data structures that are implemented in one or more of the disclosed embodiments. While the example data structures of FIG. 6 are presented as relational database tables, other embodiments utilize a variety of other data architectures. For example, some embodiments utilize one or more of an array, a linked list, an unstructured data store, a hierarchical data store, a tree, or other data structure.

FIG. 6 shows example data structure(s) implemented by some embodiments of a consumer, such as the document processing system 102, and/or the consumer 202 and/or the consumer 302. FIG. 6 illustrates a document table 600. The document table 600 includes a document identifier field 602, mailbox identifier 604, and a document field 606. The document identifier field 602 uniquely identifies a document. The mailbox identifier 604 uniquely identifies a mailbox. The document field 606 stores document data. In some embodiments, the document table 600 is implemented within the content database 108 and/or the indexed search database 112.

Figure 7:
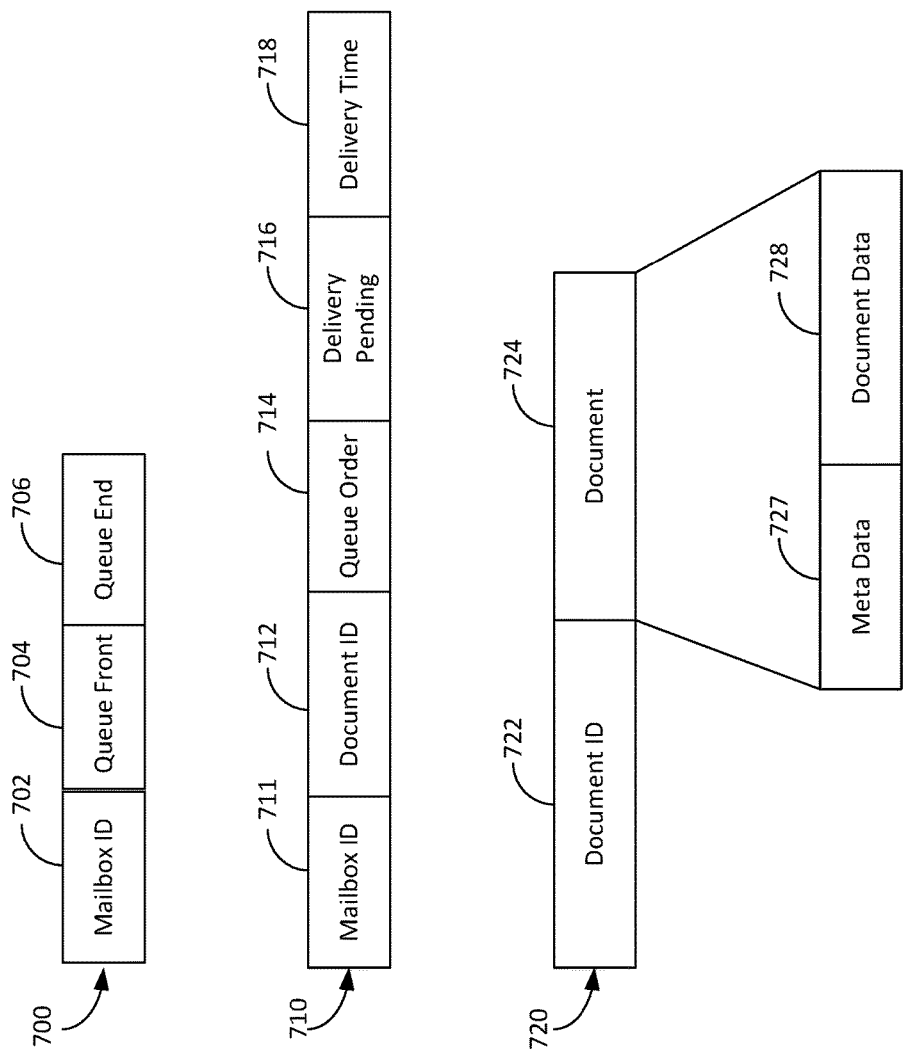
FIG. 7 illustrates example data structures that are implemented in one or more of the disclosed embodiments.

FIG. 7 illustrates example data structures that are implemented in one or more of the disclosed embodiments. While the example data structures of FIG. 7 are presented as relational database tables, other embodiments utilize a variety of other data architectures. For example, some embodiments utilize one or more of an array, a linked list, an unstructured data store, a hierarchical data store, a tree, or other data structure.

FIG. 7 shows a queue table 700, a queue entry table 710, and a document table 720. The queue table 700 defines a queue or list of data processed by a producer and conditionally available for production to a consumer. The queue table 700 implements a queue in some embodiments, and a list in other embodiments, in that removal from the queue is not strictly first in first out as is typically the case with queue structures. The queue table 700 includes a mailbox identifier field 702, queue front field 704, and queue end field 706. The mailbox identifier field 702 uniquely identifies a particular mailbox. Thus, some embodiments support asynchronous communication of data between multiple different mailboxes, each of which is identified, in at least some embodiments, via the mailbox identifier field 702. The queue front field 704 defines a front of a queue. The front of a queue is a location in the queue, in some embodiments, from which data is removed. Thus, a document identified as being at the front of the queue is next to be provided to a consumer. Thus, in some embodiments, the queue front field 704 defines the watermark indicators discussed above, with respect to FIGS. 2-5 (e.g. the first watermark 506, the second watermark 510, or the third watermark 514). The queue end field 706 defines an end of the queue. In some embodiments, the end of the queue defines a location where new data is added to the queue. Thus, for example, the next insertion pointer 505 discussed above with respect to FIG. 5, is analogous to the queue end field 706, at least in some embodiments.

The queue entry table 710 includes a mailbox field 711, document identifier field 712, a queue order field 714, a delivery pending flag field 716, and a delivery time field 718 (or delay field). The mailbox field 711 plays a similar role to the mailbox field 702, in that it identifies a particular queue being described by the particular row of the queue entry table 710. The document identifier field 712 uniquely identifies a document included in the queue. The queue order field 714 defines an order within the queue or list of the identified document. The delivery pending field 716 indicates whether the queue entry defined by a particular row of the queue entry table 710 is marked for delivery to the consumer. The delivery pending field is set to true after initial production of a result (e.g. a label of a document). The delivery pending field is also set to true in response to the document identified by the document identifier field 712 being specified in a retry request message from the consumer, as discussed above with respect to FIG. 3, and which is further discussed below. The delivery pending field 716 is cleared (e.g. set to false) when the document identified by the document identifier field 712 is produced to the consumer (e.g., via a get response message, also discussed above with respect to FIGS. 2-3, and/or FIG. 9). The delivery time field 718 indicates a time before which the data or document should not be delivered to the consumer. For example, some embodiments receive a retry request from a consumer, such as the retry request message 323 discussed above with respect to FIG. 7, which identifies data or a document, and a delay before which the data or document should not be re-produced to a consumer. Some embodiments convert the specified delay to a time of day value, and then prevent delivery of that data until a current or present time has past the time of day value, for example, as illustrated above with respect to FIG. 3.

The document table 720 includes a document identifier field 722, and a document data field 724. The document identifier field 722 uniquely identifies a document and is cross referenceable with the document identifier field 712. The document data field 724 stores data of the document.

FIG. 7 shows the document data field 724 includes a metadata field 727 and document data 728. Some of the disclosed embodiments store label information for a document in the document metadata, which in some embodiments, is represented via the metadata field 727.

The data structures of FIG. 7 are used, in some embodiments, to implement a queueing structure at a producer that is used to manage storage and delivery of data items to a consumer. Generally the queuing structure operates, in some embodiments, as a first in-first out queue. An exception to this, in at least some embodiments, occurs when a consumer requests a retry of one or more documents stored in the queue. In this case, the delivery time field 718 of a document indicates a future time, even though the document is present in the queue. Thus, a document could be positioned, in some circumstances, at a front of the queue, but not be delivered because its specified delivery time has not yet been reached.

In this case, some implementations maintain this document at the front of the queue, but skip over it when removing documents from the queue, until a document is found in the queue that can be delivered. Thus, in this case, a document is removed from the queue that is not necessarily at the head of the queue. In either case, the queue order fields 714 are maintained to link data in the queue to support a traversal from the front of the queue to the rear of the queue when searching for data qualified for removal. Some embodiments do not remove entries from the queue as they are delivered. This implementation supports the retry capability discussed above, in that if a consumer requests production of result data for a second or third time, the data is still available in the queue or list structure. In these embodiments, the retry request causes the delivery pending field 716 to be set, and a delivery time field 718 set to be consistent with any delivery delay specified in the retry request.

Some embodiments order entries in the queue or list consistent with their delivery time constraints (e.g. delivery times specified in the delivery time field 718). Thus, entries having no delivery time constraint (e.g. those entries representing data being produced for the first time to a consumer) are ordered in a FIFO manner within the queue. Entries set to be produced for a second or third time, that have delivery time constraints, are positioned in the queue in an order consistent with any other entries having delivery time constraints. Thus, entries that can be delivered earlier are positioned closer to the front of the queue than entries scheduled for a later delivery. This ordering of entries in the queue provides for monotonically increasing watermark indicators being communicated between the producer and consumer. Such an ordering is illustrated by the queue or list 312 illustrated in FIG. 3. Note the data 314 is initially positioned at a queue position indicated by watermark 1, and later, after a retry request is received for data 314, a second instance of data 314 is positioned after watermark 2. This demonstrates that a data's position in a queue or list changes as success retries of the data are implemented.

Figure 8:
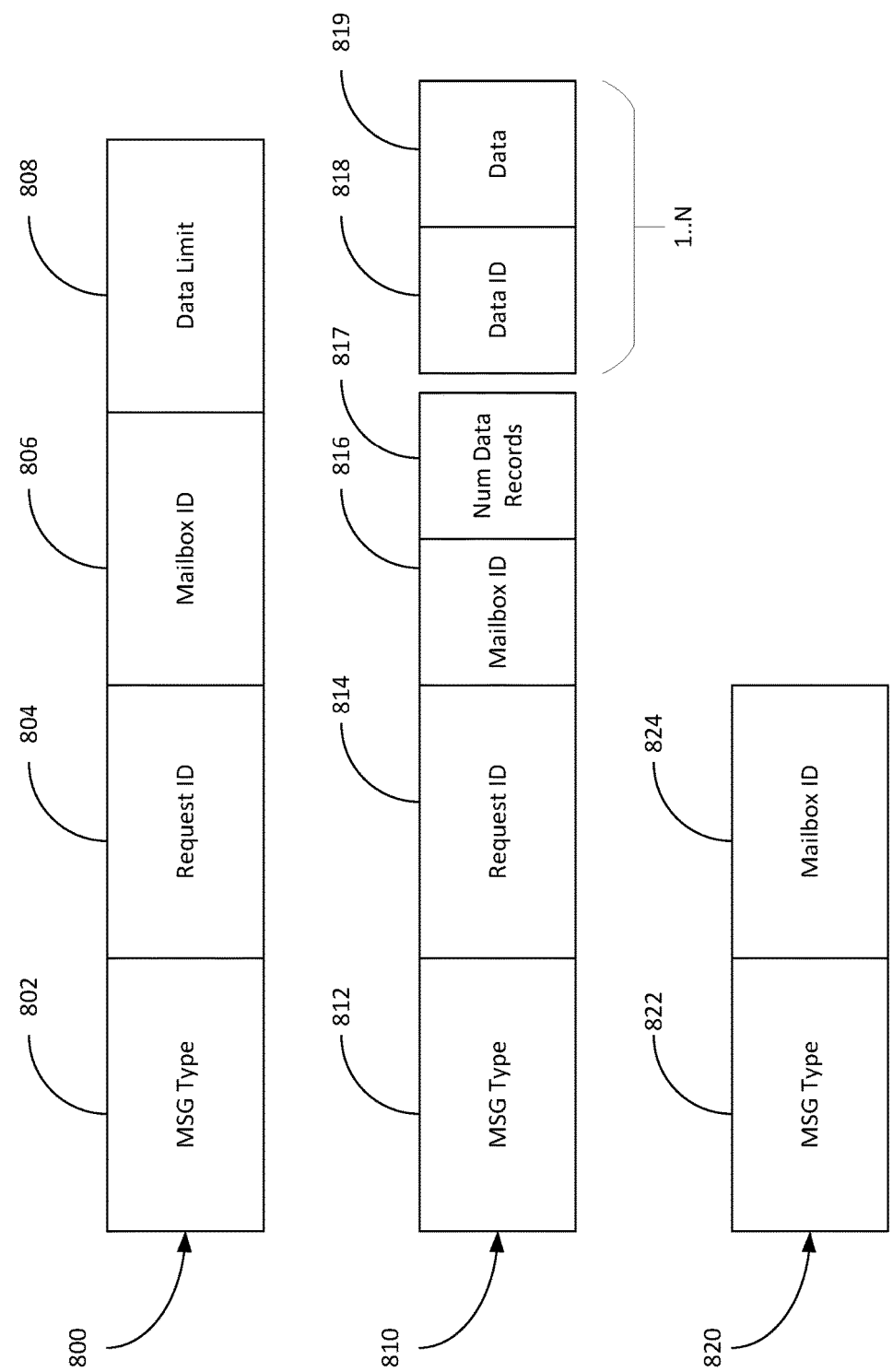
FIG. 8 shows example message formats implemented in one or more embodiments.

FIG. 8 shows example message formats implemented in one or more embodiments. FIG. 8 illustrates an example read request message 800, read response message 810, and a shoulder tap message 820. The read request message 800 is transmitted, in some embodiments, by a producer (e.g. producer 206 and/or producer 306, and/or the labeling system 104), to a consumer (e.g. consumer 202, consumer 302, or the document processing system 102). The read request message 800 includes a message type field 802, request identifier field 804, mailbox identifier field 806, and a data limit field 808. The message type field 802 indicates, via a value equivalent to a predefined constant value, that the read request message 800 is a read request message. The request identifier field 804 is a unique identifier assigned by the producer sending the read request message 800. In some embodiments, the producer utilizes the request identifier stored in the request identifier field 804 to match up responses with requests. The mailbox identifier field 806 uniquely identifies a mailbox for which the read request message applies. In other words, for which mailbox supported by the producer and consumer is data requested. The data limit field 808 specifies a maximum amount of data that should be provided in response to the read request message 800.

The read response message 810 includes a message type field 812, request identifier field 814, mailbox identifier field 816, a number of data records field 817, a data identifier field 818, and a data field 819. The message type field 812 indicates, via a value equivalent to a predefined constant value, that the read response message 810 is a read response message. The request identifier field 814 is a unique identifier assigned by the producer that sent a read request to which the read response message 810 is responsive. The mailbox identifier field 806 uniquely identifies a mailbox for which the read response message 810 applies. In other words, for which mailbox supported by the producer and consumer is data provided. The number of data records field 817 indicates how many data records follow. In other words, how many pairs of data identifier field 818 and data field 819 are included in the read response message 810. The data identifier field 818 uniquely identifies a document to a consumer. The data field 819 provides data responsive to the read request. The data field 819 stores, in some embodiments, document data of a document to be labeled by the producer.

The example shoulder tap message 820 includes a message type field 822 and a mailbox identifier field 824. The message type field 822 indicates, via a value equivalent to a predefined constant value, that the read response message 810 is a shoulder tap message. The shoulder tap message indicates that data is available for delivery in the mailbox identified by the field 824. The mailbox identifier field 824 uniquely identifies a mailbox for which the example shoulder tap message 820 applies.

Figure 9:
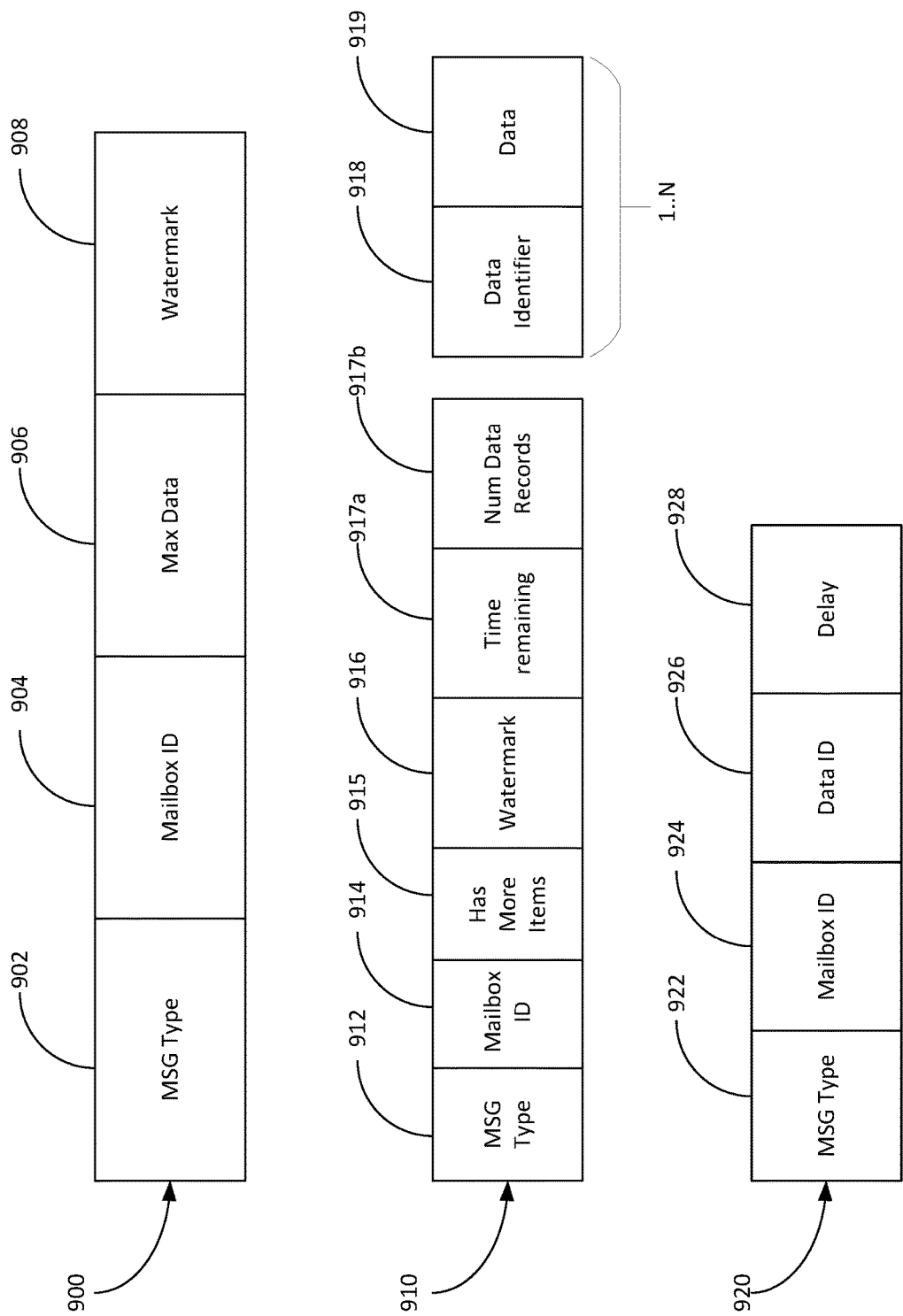
FIG. 9 shows example message formats implemented in one or more embodiments.

FIG. 9 shows example message formats implemented in one or more embodiments. FIG. 9 illustrates an example get request message 900, an example get response message 910, and an example retry message 920. The example get request message 900 includes a message type field 902, a mailbox identifier field 904, a maximum data field 906, and a watermark field 908. The message type field 902 indicates, via a value equivalent to a predefined constant value, that the get request message 900 is a get request message. The mailbox identifier field 904 uniquely identifies a mailbox for which the get request message 900 applies. In other words, for which mailbox supported by the producer and consumer is data requested. The maximum data field 906 indicates a maximum amount of data requested. For example, in some embodiments, the maximum data field 906 indicates a maximum number of labels requested by a document processing system (e.g. document processing system 102) of a labeling system (e.g. labeling system 104). The watermark field 908 indicates a position within a queue implemented by the producer (e.g. labeling system 104) from which data is requested. The watermark field, in some embodiments, is used in a manner consistent with the descriptions of FIGS. 2-3, e.g. any one of the first get request message 204, the second get request message 226, and/or the third get request message 240.

The example get response message 910 includes a message type field 912, a mailbox identifier field 914, a has more items field 915, a watermark field 916, a time remaining field 917a, a num data records field 917b, a data identifier field 918, and a data field 919. The message type field 912 indicates, via a value equivalent to a predefined constant value, that the get response message 910 is a get response message. The mailbox identifier field 914 uniquely identifies a mailbox for which the get response message 910 applies. In other words, for which mailbox supported by the producer and consumer is data provided by the get response message 910. The has more items field 915 indicates whether the producer providing the get response message 910 has additional data stored in a data queue associated with the mailbox identified by the mailbox identifier field 914. The watermark field 916 indicates a queue position after data included in the get response message 910 is removed from the queue. The time remaining field 917a indicates an elapsed time remaining before additional data is available from a producer. Thus, for example, as discussed above with respect to FIG. 3, the time remaining field is computed, in some embodiments, based on a difference between a time the get response message 910 is generated or transmitted, and a time when retried data's delay is exhausted. Time delay 333b of FIG. 3 represents an example value of the time remaining field 917a of the get response message 330.

The num data records field 917b indicates a number of pairs of data identifier field 918 and data field 919 included in the get response message 910. The data identifier field 918 uniquely identifies data provided in the get response message 910. In some embodiments, a consumer is able to correlate data provided in the get response message 910 with data provided in the read response message 810 by matching up the data identifiers indicated in each of the data identifier field 818 and the data identifier field 918. The data field 919 stores data identified by the data identifier field 918. In some embodiments, the data field 919 stores document data. In some embodiments, the data field 919 stores label data. In aggregate, the pairs of data identifier field 918 and data field 919 included in the get response message 910 include no more than a data limit specified in a corresponding get request message.

The example retry message 920 includes a message type field 922, mailbox identifier field 924, a data identifier field 926, and a delay field 928. The message type field 922 indicates, via a value equivalent to a predefined constant value, that the example retry message 920 is a retry message. The mailbox identifier field 924 uniquely identifies a mailbox for which the example retry message 920 applies. The data identifier field 926 indicates a data identifier of data (e.g. a document) the consumer seeks to retrieve again from the producer. Thus, a subsequent get request message issued to the producer from the consumer will obtain, at least in some circumstances the document or data identified by the data identifier field 926. The delay field 928 indicates an amount of time delay before the identified document should be available from the producer. Thus, for example, if the delay field indicates a delay of ten (10) minutes, the producer, upon receiving the retry message 920, will "hold" the identified data and not provide it to the consumer, until the delay period has expired. This is the case even if, for example, the consumer requests additional data, the delay period has not expired, and no data is available other than the data identified by the retry message.

Figure 10:
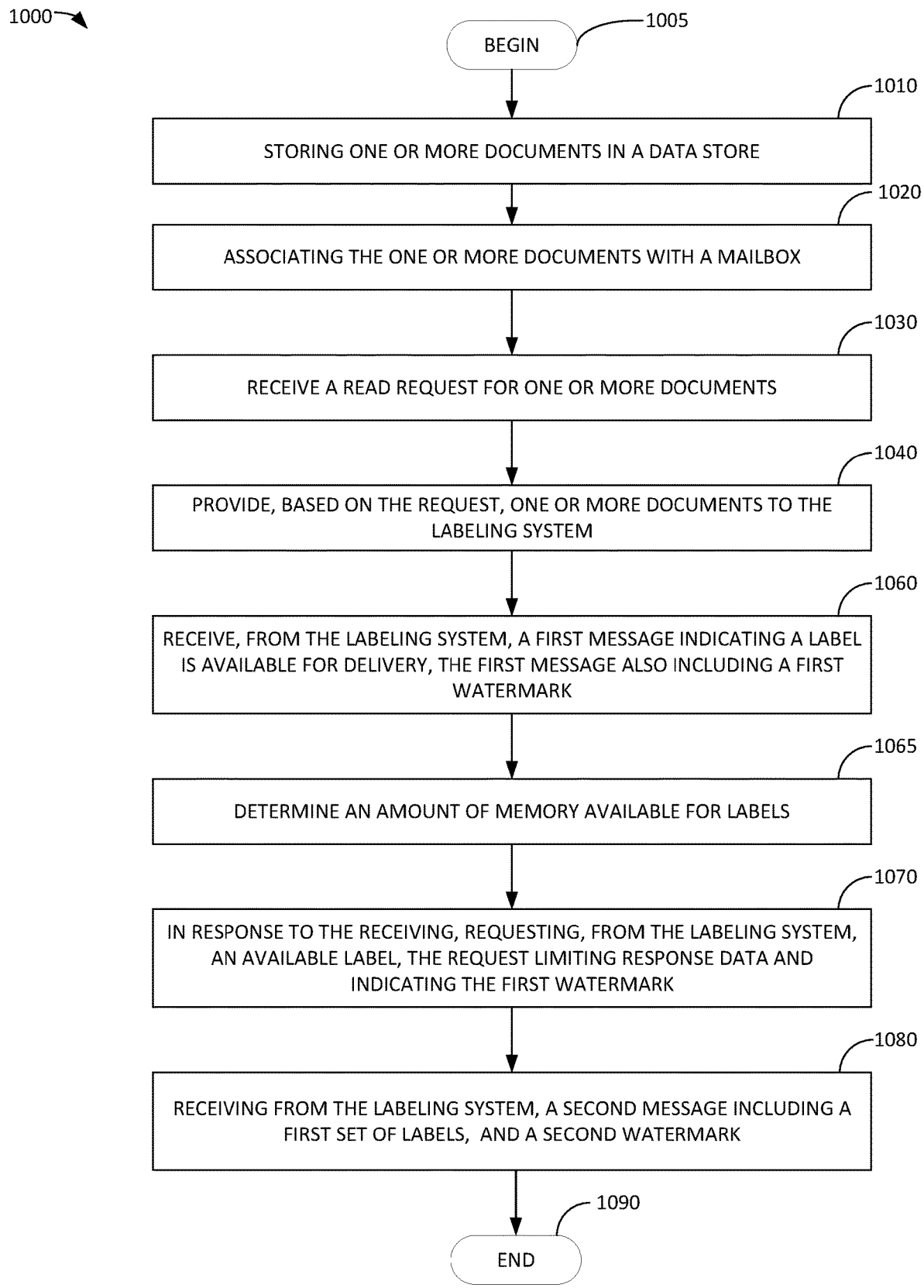
FIG. 10 is a flowchart of a method of labeling a document implemented by one or more of the disclosed embodiments.

FIG. 10 is a flowchart of a method of labeling a document implemented by one or more of the disclosed embodiments. In some embodiments, one or more of the functions discussed below with respect to FIG. 10 and process 1000 are performed by hardware processing circuitry. For example, in some embodiments, instructions (e.g., 1224 discussed below) stored in a memory (e.g., 1204 and/or 1206) configure one or more hardware processors (e.g. 1202) to perform one or more of the functions/operations discussed below with respect to FIG. 10. In some embodiments, the process 1000 is performed by the document processing system 102, discussed below with respect to FIG. 1. In some embodiments, the process 1000 is implemented in an email system, such as an exchange server, post office protocol (POP3) server, or other email server. In some embodiments, the process 1000 implements a "consumer" role in a data producer/consumer data flow, such as those discussed above with respect to FIG. 2 and/or FIG. 3. While the discussion of FIG. 10 below operates on a single mailbox or data stream between a producer and consumer, some embodiments contemplate an independent performance of process 1100 on each of multiple different mailboxes or data streams between the producer and consumer. The mailbox upon which the process 1000 is operating would be indicated, for example, in the mailbox (or mailbox identifier) fields discussed above with respect to any one or more of FIGS. 6-9. While process 1000 is described below as processing a document or documents, in other embodiments, the data processed by process 1000 is not a document, but is any other type of data.

After start operation 1005, process 1000 moves to operation 1010, where one or more documents or data items are stored in a data store. For example, as discussed above with respect to FIG. 1, in some embodiments, a consumer, such as the document processing system 102, makes one or more documents available for retrieval by a separate system, such as the labeling system 104. The data store, in this example embodiment, is the indexed search database 112.

In operation 1020, the one or more documents are associated with a mailbox. In some embodiments, associating the one or more documents with a mailbox includes storing information with the documents indicating the association. For example, as discussed above with respect to the example data structures of FIG. 6, in some embodiments, a document is associated with a mailbox via a document data structure, such as the document table 600. This allows a document processing system, such as an email server, to manage documents associated with multiple different mailboxes. In some embodiments, the mailbox discussed with respect to operation 1020 is an email mailbox. In some embodiments, the mailbox represents a unique identifier of a data flow between a consumer and a producer, and does not necessarily equate to a mailbox.

In operation 1030, one or more read requests are received for one or more of the documents. In some embodiments, the one or more read requests are received from a label system (e.g., labeling system 104 of FIG. 1). In some embodiments, each read request includes one or more of the fields discussed above with respect to the example read request message 800. For example, in some embodiments, the read requests specify a limit on an amount of data that can be provided in a response to the request (e.g. via data limit field 808). In some embodiments, operation 1030 decodes or otherwise parses one or more received read requests to identify values of fields included in the read request(s). In some embodiments, positions of the fields within the message(s) is known based on a predefined message format (e.g. the example read request message 800 of FIG. 8).

In operation 1040, documents that satisfy the one or more requests of operation 1030 are obtained from the data store. In some embodiments, the limit on the amount of data specified in a read request of operation 1030 limits a number and/or size of documents or data read from the data store in operation 1040.

The retrieved documents or data responsive to the requests of operation 1030 are provided to the data requestor (e.g. a label generating system) in operation 1040. In some embodiments, operation 1040 generates a message including one or more of the fields of the read response message 810, discussed above with respect to FIG. 8. For example, in some embodiments, a consumer includes one or more documents and their respective identifiers in the generated message (identifiers stored in the document identifier field 602 are indicated in the data identifier field 818, and documents stored in the document field 604 are stored in one or more instances of the data field 819). The generated message is then transmitted to the producer in some embodiments. (e.g. the labeling system 104).

In some embodiments, a one to one correspondence between read requests and documents is implemented, and thus, each request received generates a corresponding response that includes a single document.

In operation 1060, a first message is received indicating a label for at least one of the plurality of documents is available. The first message also includes a first watermark. In some embodiments, operation 1060 decodes or otherwise parses the first message to identify the label and/or first watermark (e.g. based on a predefined format of the first message). In some embodiments, the message received in operation 1060 includes one or more of the fields discussed above with respect to the example shoulder tap message 820.

In operation 1065, an amount of memory available to store label information or labels is determined. For example, as discussed above with respect to FIG. 1, some consumers, such as the document processing system 102 of FIG. 1, implement a data quota management function that limits an amount of computer resources (e.g. one or more of memory, disk storage space, processing power, etc) allocated to obtaining label information from a producer. Thus, operation 1065, in some embodiments, compares a total amount of memory allocated for this purpose against a currently in use amount of memory, to determine the amount of memory available.

In operation 1070, a request is made to retrieve data from the producer based on receipt of the message in operation 1060. In some embodiment, the request is in the form of a message, such as the example get request message 900 discussed above with respect to FIG. 9, and includes one or more fields of the example get request message 900. For example, in some embodiments, operation 1070 generates a get request message and specifies in the generated message, a maximum amount of data or a maximum amount of documents to be retrieved (e.g. consistent with the description of field 906, discussed above). In some embodiments, the maximum amount of data or documents is based on an amount of buffer space available to store the requested data when it arrives (e.g. implementing the quota enforcement of component 126 discussed above with respect to FIG. 1) and as determined by operation 1065. By specifying the maximum amount of data to obtain, the consumer implementing the process 1000 ensures it does not receive too much data that is unable to store, which could otherwise result in a loss of data.

In operation 1080, label information is received from the producer. In some embodiments, the label information includes labels for one or more documents. An amount of label information received in operation 1080 is in conformance with the maximum data parameter described above with respect to operation 1070. Some embodiments of operation 1080 associate the received label information with documents stored in a data store, such as the data store discussed above with respect to operation 1010 (e.g. the content database 108 of FIG. 1). Associating the received label information with documents includes, in some embodiments, stamping the documents with their appropriate labels. In some embodiments, a label for a document is stored in the document's properties, or other meta-data of the document.

In some embodiments, an error is experienced while processing label information during operation 1080, such that the label information is lost or is unable to be associated with a proper document. For example, in some embodiments, an error is encountered while attempting to stamp a document with its label. In some of these embodiments, operation 1080 generates a retry request. The retry request indicates, to the producer, that the consumer requests the producer to resend data (e.g., label data) previously provided to the consumer. In some embodiments, the retry request is a message including one or more of the fields of the example retry message 920. In some embodiments, the retry message indicates a document identifier of the document the consumer requests be produced again by the producer. In the example of process 1000, the retry request includes a document identifier of a document received in operation 1060. In some embodiments, a response from the producer acknowledges the retry request message (e.g. the retry confirmation message 326 of FIG. 3), and thus process 1000 includes receiving and decoding the retry response message in some embodiments. After the retry message is acknowledged, in some embodiments, operation 1080 generates an additional get request message indicating the watermark specified in the previous get request. A second get response message is then received from the producer, including data dequeued at the producer according to the watermark.

Some embodiments include generating multiple get requests indicating a maximum retrieval amount, and receiving multiple get response messages from the producer. In some embodiments, operation 1080 adjusts the maximum retrieval amount indicating in the get request(s) based on an amount of data available in a storage space allocated for storing the data. (e.g. a buffer allocated for storing label information before it is associated with documents and or delivered to another system—per description of operation 1065).

Some embodiments of operation 1080 evaluate an indication in one or more get response messages to determine if the producer has additional data available (e.g. by decoding and evaluating the has more items field 915 in some embodiments). If the producer does not have any more data, operation 1080 inhibits, in some embodiments, further get request messages until a new shoulder tap message is received from the producer (e.g. similar to the first message discussed above with respect to operation 1060). Upon receiving the new shoulder tap message, inhibiting of get data requests is ceased, and/or one or more of operations 1065, 1070, and 1080 are performed again, at least in some embodiments. Thus, in some embodiments, process 1000 is performed iteratively.

In some embodiments, one or more received get response message indicate no further data is currently available, but that some data will be available later at an indicated time (e.g. as demonstrated by the get response message 330, discussed above with respect to FIG. 3). In some embodiments, a time additional data will be available is communicated in the time remaining field 917a, discussed above with respect to FIG. 1. Thus, in some embodiments, a consumer performing process 1000 sets a timer according to the indicating time before additional data will be available, and upon expiration of the timer, requests data from the producer. Alternatively, some consumers implement an internal polling mechanism that checks an amount of time remaining periodically, and then requests data when the time remaining before data is available reaches a zero value.

After operation 1080 completes, process 1000 moves to end operation 1090.

Figure 11:
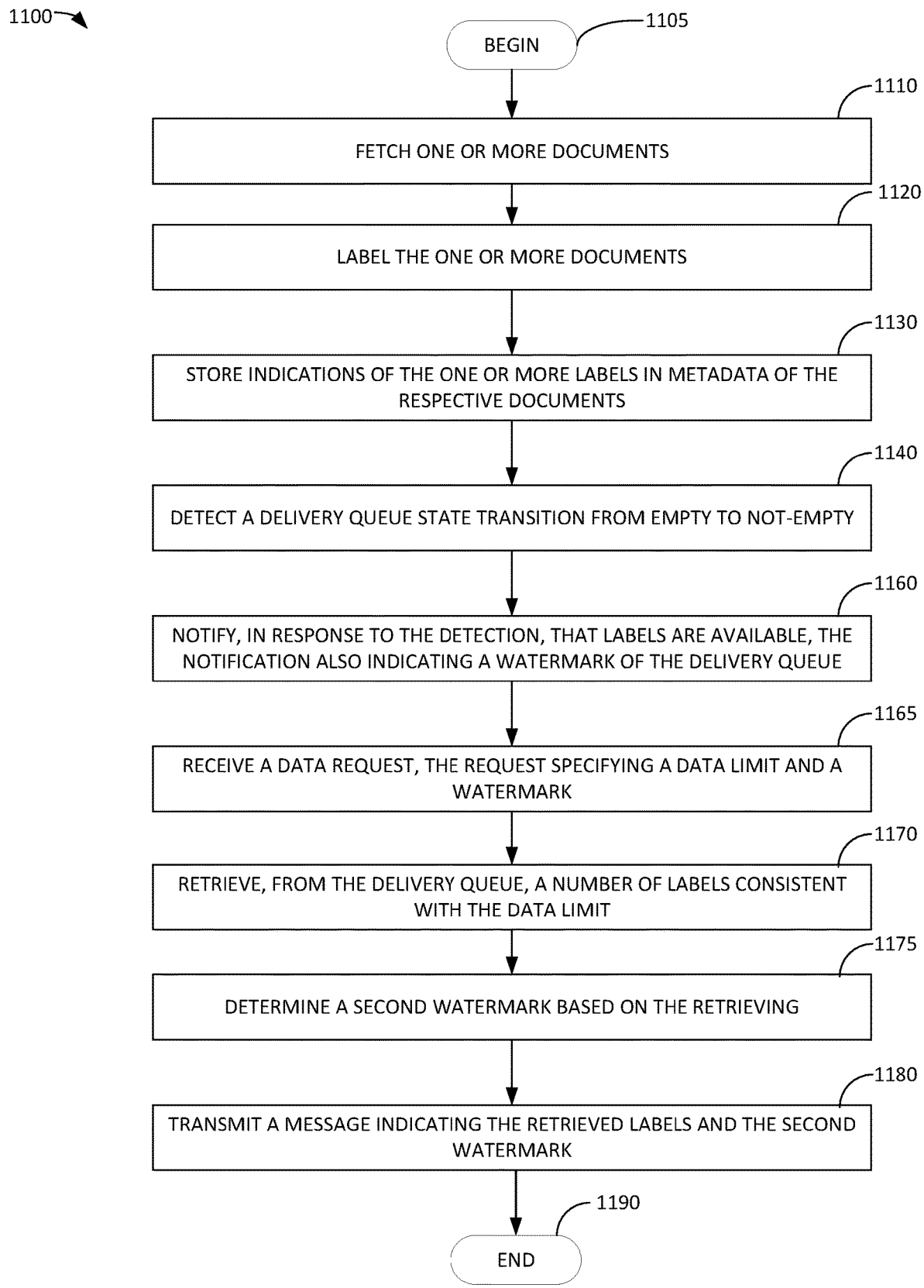
FIG. 11 is a flowchart of a method of labeling a document implemented by one or more of the disclosed embodiments.

FIG. 11 is a flowchart of a method of labeling a document implemented by one or more of the disclosed embodiments. In some embodiments, one or more of the functions discussed below with respect to FIG. 11 and process 1100 are performed by hardware processing circuitry. For example, in some embodiments, instructions (e.g., 1224 discussed below) stored in a memory (e.g., 1204 and/or 1206) configure one or more hardware processors (e.g. 1202) to perform one or more of the functions/operations discussed below with respect to FIG. 11. In some embodiments, the process 1100 is performed by the labeling system 104, discussed above with respect to FIG. 1. In some embodiments, the process 1100 implements a "producer" role in a data producer/consumer data flow, such as those discussed above with respect to FIG. 2 and/or FIG. 3. While the discussion of FIG. 11 below operates on a single mailbox or data stream between a producer and consumer, some embodiments contemplate an independent performance of process 1100 on each of multiple different mailboxes or data streams between the producer and consumer. The mailbox upon which the process 1100 is operating would be indicated, for example, in the mailbox (or mailbox identifier) fields discussed above with respect to any one or more of FIGS. 6-9. While process 1100 is described below as processing a document or documents, in other embodiments, the data processed by process 1000 is not a document, but is any other type of data.

After start operation 1105, process 1100 moves to operation 1110, where a plurality of documents are stored in a data store. In operation 1110, a plurality of documents are fetched from a data store. For example, as discussed above with respect to FIG. 1, in some embodiments, a producer (e.g. the labeling system 104, the producer 206, and/or the producer 306) retrieves of fetches documents from an indexed search database 112 maintained by a consumer, such as the document processing system 102, the consumer 202 or the consumer 302. In some embodiments, fetching the documents includes generating one or more read request messages, such as the read request message 800 discussed above with respect to FIG. 8, and/or receiving one or more corresponding read response messages, such as the read response message 810, discussed above with respect to FIG. 8. For example, pairs of the data identifier field 818 and data field 819 of the read response message 810 provide the plurality of documents fetched by operation 1110, at least in some embodiments. In some embodiments, a producer stores the retrieved data and its respective identifier(s) in a local storage, or a data store maintained by the producer. For example, as illustrated in FIG. 1, the producer (e.g. the labeling system 104), retrieves documents from the indexed search database 112 and stores the documents in the document data store 114. The identifiers of the data is used later, as discussed below, when providing labels to the consumer. The consumer is able to correlate labels provided by the producer, with its own copy of the documents, by cross referencing the identifiers provided with the labels with the identifiers of the documents (e.g. matching up identifiers in the get response message 910, field 918, with document identifier field 602 values).

In operation 1120, the plurality of documents are labeled. For example, labeling the documents includes, in some embodiments, scanning the documents for one or more keywords, and labeling the documents based on whether the keywords are found, or a frequency or numerosity of the keywords. Some embodiments evaluate one or more regular expressions on contents of the documents, and label the documents based, at least in part, on output of the regular expression evaluation. For example, in some embodiments, regular expressions designed to identify credit card numbers, user names, social security numbers, driver's license numbers, passwords, or other types of personally identifiable information, as evaluated against the documents, with the output of these regular expressions used to determine a label for the document. For example, in an example embodiment, a document receives a first label, if no credit card information is found, and a second label if credit card information is found.

Some embodiments of operation 1120 include evaluating a document before labeling to determine if the document already has a label. In this case, some embodiments simply utilize the label of the document as a computed label (which is passed back to the document processing system as discussed below), instead of computing a new label for the document. In some embodiments, any existing label(s) of the document is used as input to the labels computed in operation 1120. For example, in some embodiments, the labeling performed in operation 1120 utilizes an existing label of the document as an advisory, but the existing label is not determinative as to the label produced for the document in operation 1120.

In operation 1130, indications of labels are stored in metadata of their respective documents. For example, as discussed above, in some embodiments, a device performing the process 1100, such as a producer in a consumer/producer data flow, and/or a labeling system, such as the labeling system 104 discussed above with respect to FIG. 1, stores documents in a data store such as the document data store 114. The documents, in some embodiments, include space allocated for metadata. Thus, in some embodiments, the labels for the documents are stored in the document metadata. For example, documents in Microsoft Word format, include properties that are considered metadata, at least in some embodiments. Thus, some embodiments store document labels as properties in Microsoft word documents. Other document formats differ in their approach to metadata. However, the disclosed embodiments contemplate of these other document formats with storage in their respective metadata as appropriate for their respective format or data architecture. In some embodiments, once label information is available for a document, the label information is added to a queue, such that the data is made available for delivery to a consumer. While some embodiment utilize a queue, other embodiments may employ other data structures, such as a list of documents available for delivery, or a list of documents that have been labeled. In these embodiments, the list or queue or other structure is consulted as needed to deliver documents to a consumer.

In operation 1140, a state transition of a queue (or list) from an empty state to a non-empty state is detected. In some embodiments, the transition results from a document being labeled, and the label being made available for delivery to a consumer by placing the label information on the queue or list. Such a transition is illustrated above with respect to FIG. 4 and transition 406. Generally, whether the queue is empty or non-empty determines whether the producer indicates whether data is available for delivery or not (e.g. via the should tap message or other data available indications, such as those provide in the field 915, discussed above with respect to the get response message 910.

In operation 1160, a notification that label information is available is generated. The notification is provided to a consumer. In some embodiments, the consumer is a document processing system, such as the document processing system 102 discussed above with respect to FIG. 1. In some embodiments, the notification takes the form of a network message, which, in some embodiments, includes one or more of the fields of the example shoulder tap message 820, discussed above with respect to FIG. 8. The network message is transmitted, in some embodiments, by the producer to the consumer. As discussed above, the producer, in some embodiments, is a labeling system (e.g. labeling system 104)

and the consumer is a document processing system (e.g. document processing system 102).

In operation 1165, a request for label data is received. The request indicates a maximum number of labels or a maximum amount of label data to be delivered. In some embodiments, the request is a network message transmitted from a consumer to a producer. In some embodiments, the request includes one or more fields of the example get request message 900, discussed above with respect to FIG. 9. For example, the request specifies, in some embodiments a watermark from which the request should be satisfied. Some embodiments of operation 1165 decode or otherwise parse the request for label data to extract or identify the watermark and data limit (e.g. fields 906 and/or fields 908). The watermark indicates, in some embodiments, a position within the queue or list discussed above from which data satisfying the request are to be retrieved. Thus, documents prior to the watermark, in the queue or list order, are not provided in response to the request, and instead only documents positioned at or later than the provided watermark as responsive to the request. For example, as discussed above with respect to FIG. 2, if a consumer specifies watermark 2 in a get request message, data 232, 234, and 245 are potentially available to satisfy the get request, while data 214, 218, and 220 are not available to satisfy the get request. This example assumes an order of the queue or list 212 runs from data 214 to data 245, e.g., a downward direction with respect to FIG. 2.

In operation 1170, one or more labels are obtained to satisfy the request of operation 1165. In some embodiments, operation 1170 determines which documents or data is available for delivery to the consumer, based on the list or queue discussed above, and the watermark decoded from the data request of operation 1165. Data available for delivery includes data on the list or queue, subsequent in a queue or list order to the indicated watermark of the delivery request, and also having a delivery time before or at a current time, no delivery time constraint, or having a delivery delay that has expired.

In operation 1175, a second watermark is determined. For example, in some embodiments, labels retrieved from the queue include a label that was at the front of the queue. In this case, the watermark is updated to indicate a new front of the queue. For example, as discussed above with respect to, FIG. 2, if data 214 is removed from the queue or list 212, the watermark or front of the queue is updated to identify data 218 as the new front of the queue. Note that in some embodiments, the queue is ordered such that data without any delivery time constraints is placed before data with delivery time constraints in the queue, and thus, the front of the queue represents data most eligible for delivery.

In operation 1180, a message is transmitted indicating the retrieved labels and the updated front of the queue. In some embodiments, the message of operation 1180 is generated to include one or more of the fields discussed above with respect to the example get response message 910. For example, in some embodiments, operation 1180 indicates a number of labels retrieved in operation 1170 and included in the get response message (e.g. via field 917*b*) along with the data and identifiers of the data (e.g. via fields 918 and 919 respectively). In some embodiments, the data identifiers (of documents or other data) provided to the consumer are correlated with data identifiers retrieved or fetched from the consumer in operation 1110 when the data was originally fetched for labeling.

In some embodiments, the get response message of operation 1180 indicates whether additional data is available for retrieval. This indication only considers data (e.g. label data otherwise available for delivery to a consumer) that does not have an unexpired time delay (e.g. documents without a delivery time field 718 indicating a time after a present time).

As illustrated in FIG. 3, some embodiments of the get response message of operation 1180 are generated to indicate a time remaining before more data will be available.

Process 1100 ensures that the labels provided in the get response message of operation 1165 do not exceed any data limitations specified in the get request message (e.g. specified in field 906 in some embodiments).

In some embodiments, process 1100 includes receiving a retry request from the consumer (e.g. including any one or more of the fields of the example retry request message 920, discussed above with respect to FIG. 1. In some embodiments, a document identifier is decoded from the retry request, by parsing or otherwise decoding the retry request based on a predefined message format of the retry request. Process 1100 then searches its delivery queue or list structure to identify data associated with the provided document identifier, and indicates, via the delivery queue, that the document is to be re-requeued so as to be produced, again, to the consumer (e.g. by setting the delivery pending field 716 in the example queue entry table 710. In some embodiments, an indication of a time delay is decoded from the retry request (e.g. from field 928 in some embodiments). As discussed above, for example with respect to FIGS. 3 and/or 5, the data identified by the document identifier is re-queued so as to indicate the data is not to be delivered until a time consistent with the indicated delay.

After operation 1180 completes, process 1100 moves to end operation 1190.

Figure 12:
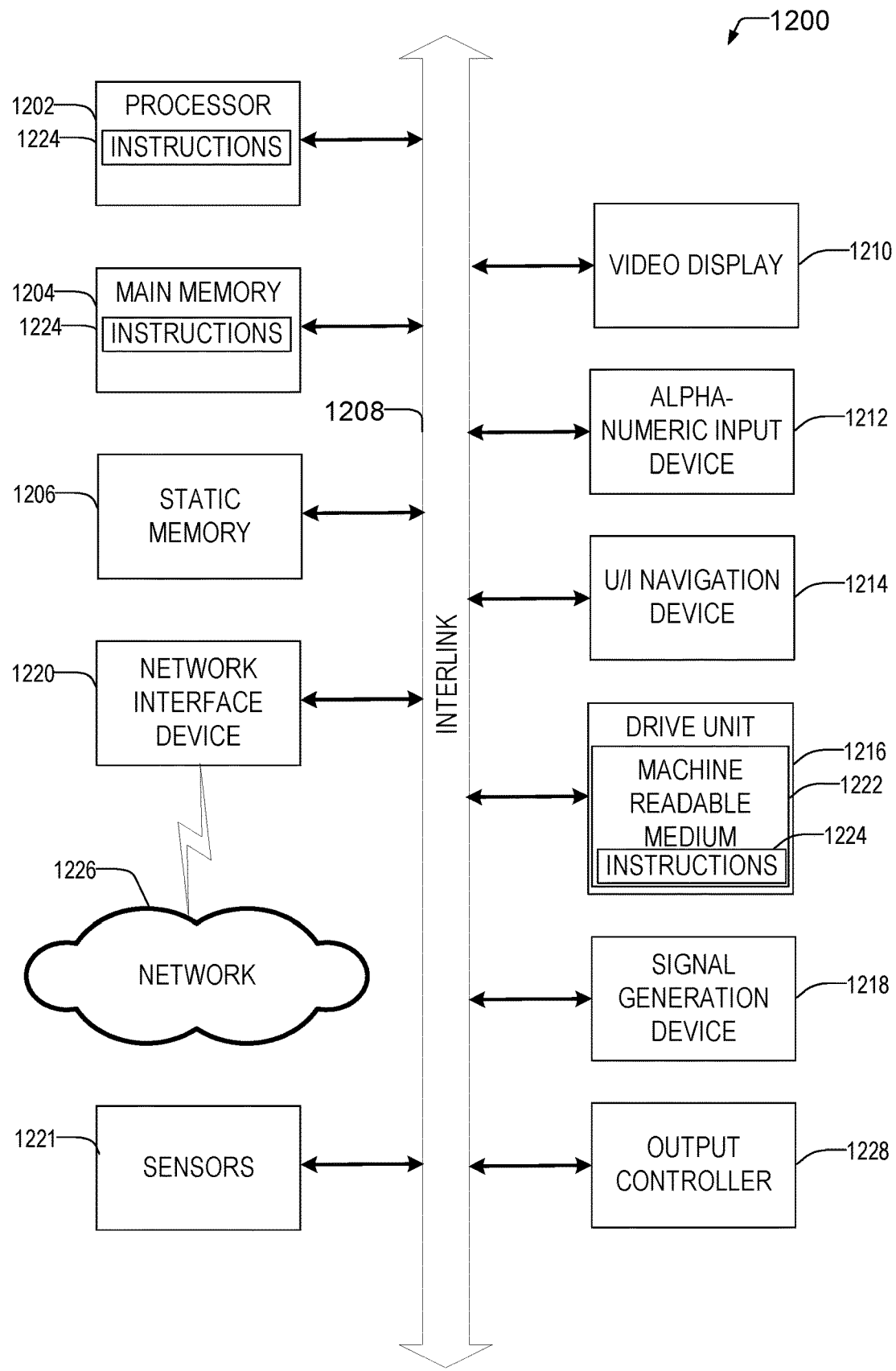
FIG. 12 illustrates a block diagram of an example machine upon which any one or more of the techniques (e.g., methodologies) discussed herein may perform

FIG. 12 illustrates a block diagram of an example machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1200 may perform one or more of the processes described above with respect to FIGS. 1-11. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink 1208 (e.g., bus). The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1224 may further be transmitted or received over a communications network 1226 using a transmission medium via the network interface device 1220. The machine 1200 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

In Example 1, the subject matter of Example undefined optionally includes, further comprising: processing, by the document processing system, a document having a first document identifier and at least one of the labels; detecting, based on the processing, an error; and generating, in response to the error, a request to the label system to resend the document having the first document identifier.

In Example 2, the subject matter of Example 1 optionally includes wherein the generating of the request generates the request to include a time delay before the document having the first document identifier is produced.

In Example 3, the subject matter of any one or more of Examples 1-2 optionally include requesting, from the labeling system, data up to the limit, the request including the first watermark; receiving, from the labeling system, a third message; and decoding, from the third message, a second set of labels, the second set of labels overlapping with the first set of labels.

In Example 4, the subject matter of Example undefined optionally includes, further comprising: request, from the labeling system, the limit, the request including the second watermark; and receiving, from the labeling system, a third message including a second set of labels, the third message further indicating there are no additional labels available.

In Example 5, the subject matter of any one or more of Examples 3-4 optionally include inhibiting, by the document processing system, a further request for a label based on the indication that there are no labels available; receiving, by the document processing system, from the labeling system, a fourth message; decoding, from the fourth message, a third watermark and an indication that a label is available; and ceasing, based on the indication that a label is available, to inhibit a request for a label.

Example 6 is a system, comprising: hardware processing circuitry; one or more hardware memories storing instructions that when executed configure the hardware processing circuitry to perform operations, comprising: storing a plurality of documents in a data store; receiving read requests for the plurality of documents from a labeling system; retrieving the plurality of documents from the data store; providing, based on the retrieving, the plurality of documents to the labeling system; receiving from the labeling system, a first message; decoding, from the first message, a first watermark and an indication that a label for at least one of the plurality of documents is available; determining a label storage space available; determining, based on the label storage space available, a limit on response data; generating a data request to include the determined limit and the first watermark; transmitting the data request to the labeling system; receiving from the labeling system, a second message; decoding, from the second message, a first set of labels and a second watermark, the first set of labels; and associating each label in the first set of labels with its respective document in the data store.

In Example 7, the subject matter of Example 6 optionally includes the operations further comprising: processing, by the document processing system, a document having a first document identifier and at least one of the labels; detecting, based on the processing, an error; and generating, in response to the error, a request to the label system to resend the document having the first document identifier.

In Example 8, the subject matter of Example 7 optionally includes wherein the generating of the request generates the request to include a time delay before the document having the first document identifier is produced.

In Example 9, the subject matter of any one or more of Examples 7-8 optionally include the operations further comprising: requesting, from the labeling system, data up to the limit, the request including the first watermark; receiving, from the labeling system, a third message; and decoding, from the third message, a second set of labels, the second set of labels overlapping with the first set of labels.

In Example 10, the subject matter of any one or more of Examples 6-9 optionally include the operations further comprising: request, from the labeling system, the limit, the request including the second watermark; and receiving, from the labeling system, a third message including a second set of labels, the third message further indicating there are no additional labels available.

In Example 11, the subject matter of any one or more of Examples 9-10 optionally include the operations further comprising: inhibiting, by the document processing system, a further request for a label based on the indication that there are no labels available; receiving, by the document processing system, from the labeling system, a fourth message; decoding, from the fourth message, a third watermark and an indication that a label is available; and ceasing, based on the indication that a label is available, to inhibit a request for a label.

Example 12 is a non-transitory computer readable storage medium comprising instructions that when executed configure hardware processing circuitry to perform operations comprising: storing a plurality of documents in a data store; receiving read requests for the plurality of documents from a labeling system; retrieving the plurality of documents from the data store; providing, based on the retrieving, the plurality of documents to the labeling system; receiving from the labeling system, a first message; decoding, from the first message, a first watermark and an indication that a label for at least one of the plurality of documents is available; determining a label storage space available; determining, based on the label storage space available, a limit on response data; generating a data request to include the determined limit and the first watermark; transmitting the data request to the labeling system; receiving from the labeling system, a second message; decoding, from the second message, a first set of labels and a second watermark, the first set of labels; and associating each label in the first set of labels with its respective document in the data store.

In Example 13, the subject matter of Example 12 optionally includes the operations further comprising: processing, by the document processing system, a document having a first document identifier and at least one of the labels; detecting, based on the processing, an error; and generating, in response to the error, a request to the label system to resend the document having the first document identifier.

In Example 14, the subject matter of Example 13 optionally includes wherein the generating of the request generates the request to include a time delay before the document having the first document identifier is produced.

In Example 15, the subject matter of any one or more of Examples 12-14 optionally include the operations further comprising: requesting, from the labeling system, data up to the limit, the request including the first watermark; receiving, from the labeling system, a third message; and decoding, from the third message, a second set of labels, the second set of labels overlapping with the first set of labels.

In Example 16, the subject matter of any one or more of Examples 12-15 optionally include the operations further comprising: request, from the labeling system, the limit, the request including the second watermark; and receiving, from the labeling system, a third message including a second set of labels, the third message further indicating there are no additional labels available.

In Example 17, the subject matter of any one or more of Examples 12-16 optionally include the operations further comprising: inhibiting, by the document processing system, a further request for a label based on the indication that there are no labels available; receiving, by the document processing system, from the labeling system, a fourth message; decoding, from the fourth message, a third watermark and an indication that a label is available; and ceasing, based on the indication that a label is available, to inhibit a request for a label.

Example 18 is a computing device implemented method, comprising: fetching, from a document processing system, a document; determining a label of the document; storing the label in metadata of the document; storing, in a delivery queue, indications of the label; detecting a transition of a state of the delivery queue from empty to not empty; notifying, in response to the detecting, the document processing system that the label is available, the notifying further indicating a first watermark of the delivery queue; receiving a request for data from the document processing system; decoding, from the request for data, a limit on response data and the first watermark; retrieving, from the delivery queue, and based on the first watermark decoded from the request for data, a number of labels consistent with the limit on response data; determining, based on the number of labels, a second watermark of the delivery queue; generating a first data response message to indicate the number of labels, a retrieved label, and the second watermark; and transmitting the first data response message to the document processing system.

In Example 19, the subject matter of Example 18 optionally includes wherein the message further indicates whether additional data is available in the delivery queue.

In Example 20, the subject matter of any one or more of Examples 18-19 optionally include receiving, from the document processing system, a request to re-queue the retrieved label for delivery; and adjusting the delivery queue to indicate the retrieved label is pending for delivery.

In Example 21, the subject matter of Example 20 optionally includes decoding, from the request to re-queue the retrieved label, an indication of a delay before delivery of the retrieved label; and inhibiting delivery of the retrieved label until a time consistent with the indication of the delay in response to the decoding of the request to re-queue the retrieved label.

In Example 22, the subject matter of Example 21 optionally includes inhibiting an indication that the retrieved label is available for delivery until the time consistent with the indication.

In Example 23, the subject matter of any one or more of Examples 18-22 optionally include receiving a data request from the document processing system; decoding, from the data request, a response data limit and the second watermark; second retrieving, based on the second watermark and the response data limit, a second label from the delivery queue; determining, based on the second retrieving, a third watermark; generating a second data response message to include the second label and the third watermark; and transmitting the second data response message to the document processing system.

Example 24 is a system, comprising: hardware processing circuitry; one or more hardware memories storing instructions that when executed configure the hardware processing circuitry to perform operations comprising: fetching, from a document processing system, a document; determining a label of the document; storing the label in metadata of the document; storing, in a delivery queue, indications of the label; detecting a transition of a state of the delivery queue from empty to not empty; notifying, in response to the detecting, the document processing system that the label is available, the notifying further indicating a first watermark of the delivery queue; receiving a request for data from the document processing system; decoding, from the request for data, a limit on response data and the first watermark; retrieving, from the delivery queue, and based on the first watermark decoded from the request for data, a number of labels consistent with the limit on response data; determining, based on the number of labels, a second watermark of the delivery queue; generating a first data response message to indicate the number of labels, a retrieved label, and the second watermark; and transmitting the first data response message to the document processing system.

In Example 25, the subject matter of Example 24 optionally includes wherein the message further indicates whether additional data is available in the delivery queue.

In Example 26, the subject matter of any one or more of Examples 24-25 optionally include the operations further comprising: receiving, from the document processing system, a request to re-queue the retrieved label for delivery; and adjusting the delivery queue to indicate the retrieved label is pending for delivery.

In Example 27, the subject matter of Example 26 optionally includes the operations further comprising: decoding, from the request to re-queue the retrieved label, an indication of a delay before delivery of the retrieved label; and inhibiting delivery of the retrieved label until a time consistent with the indication of the delay in response to the decoding of the request to re-queue the retrieved label.

In Example 28, the subject matter of Example 27 optionally includes the operations further comprising inhibiting an indication that the retrieved label is available for delivery until the time consistent with the indication.

In Example 29, the subject matter of any one or more of Examples 24-28 optionally include the operations further comprising: receiving a data request from the document processing system; decoding, from the data request, a response data limit and the second watermark; second retrieving, based on the second watermark and the response data limit, a second label from the delivery queue; determining, based on the second retrieving, a third watermark; generating a second data response message to include the second label and the third watermark; and transmitting the second data response message to the document processing system.

Example 30 is a non-transitory computer readable storage medium comprising instructions that when executed configure hardware processing circuitry to perform operations comprising: fetching, from a document processing system, a document; determining a label of the document; storing the label in metadata of the document; storing, in a delivery queue, indications of the label; detecting a transition of a state of the delivery queue from empty to not empty; notifying, in response to the detecting, the document processing system that the label is available, the notifying further indicating a first watermark of the delivery queue; receiving a request for data from the document processing system; decoding, from the request for data, a limit on response data and the first watermark; retrieving, from the delivery queue, and based on the first watermark decoded from the request for data, a number of labels consistent with the limit on response data; determining, based on the number of labels, a second watermark of the delivery queue; generating a first data response message to indicate the number of labels, a retrieved label, and the second watermark; and transmitting the first data response message to the document processing system.

In Example 31, the subject matter of Example 30 optionally includes wherein the message further indicates whether additional data is available in the delivery queue.

In Example 32, the subject matter of any one or more of Examples 30-31 optionally include the operations further comprising: receiving, from the document processing system, a request to re-queue the retrieved label for delivery; and adjusting the delivery queue to indicate the retrieved label is pending for delivery.

In Example 33, the subject matter of Example 32 optionally includes the operations further comprising: decoding, from the request to re-queue the retrieved label, an indication of a delay before delivery of the retrieved label; and inhibiting delivery of the retrieved label until a time consistent with the indication of the delay in response to the decoding of the request to re-queue the retrieved label.

In Example 34, the subject matter of Example 33 optionally includes the operations further comprising inhibiting an indication that the retrieved label is available for delivery until the time consistent with the indication.

In Example 35, the subject matter of any one or more of Examples 30-34 optionally include the operations further comprising: receiving a data request from the document processing system; decoding, from the data request, a response data limit and the second watermark; second retrieving, based on the second watermark and the response data limit, a second label from the delivery queue; determining, based on the second retrieving, a third watermark; generating a second data response message to include the second label and the third watermark; and transmitting the second data response message to the document processing system.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

The invention claimed is:

1. A system, comprising:
hardware processing circuitry;
one or more memories storing instructions that when executed configure the hardware processing circuitry to perform operations comprising:
storing a plurality of documents in a data store resulting in stored documents;
receiving a read request for the stored documents from a labeling system;
responsive to the read request, retrieving the plurality of documents from the data store;
providing, based on the retrieving, the plurality of documents to the labeling system;
receiving from the labeling system, a first message;
decoding, from the first message,
a first watermark indicating a first data item in a delivery queue that is to be retrieved next and
an indication that a label that indicates a sensitivity level for at least one of the plurality of documents is available;
determining a label storage space available in one or more memories;
determining, based on the determined label storage space available, a data limit on an amount of response data;
generating a data request that includes the determined limit and the first watermark;
transmitting the data request to the labeling system;
receiving from the labeling system, a second message,
responsive to receiving the second message, attempting to decode, from the second message,
first labels including the first data item and
a second watermark indicating a second data item in the delivery queue after the first labels;
providing a retry request for the first labels;
adjusting the delivery queue to indicate the first labels are pending for delivery based on a time in the retry request; and
associating each label in the first labels with its respective document in the data store.

2. The system of claim 1, the operations further comprising:
processing, by the document processing system, a document having a first document identifier and at least one of the first labels;
detecting, based on the processing, an error; and
generating, in response to the error, a request to the label system to resend the document having the first document identifier.

3. The system of claim 2, the operations further comprising:
requesting, from the labeling system, data up to the limit, the request including the first watermark;
receiving, from the labeling system, a third message; and
decoding, from the third message, a second set of labels, the second set of labels overlapping with the first set of labels.

4. The system of claim 3, the operations further comprising:
inhibiting, by the document processing system, a further request for a label based on the indication that there are no labels available;
receiving, by the document processing system, from the labeling system, a fourth message;
decoding, from the fourth message, a third watermark and an indication that a label is available; and
ceasing, based on the indication that a label is available, to inhibit a request for a label.

5. The system of claim 2, wherein the generating of the request generates the request to include a time delay before the document having the first document identifier is produced.

6. The system of claim 1, the operations further comprising:
request, from the labeling system, the limit, the request including the second watermark; and
receiving, from the labeling system, a third message including a second set of labels, the third message further indicating there are no additional labels available.

7. A computing device implemented method, comprising:
responsive to a read request, fetching, from a document processing system, a document;
determining a label of the document, the label indicating a sensitivity level of the document;
storing the label in metadata of the document;
storing, in a delivery queue, indications of the label;
detecting a transition of a state of the delivery queue from empty to not empty;
notifying, in response to the detecting, the document processing system that the label is available, the notifying further indicating a first watermark of the delivery queue, the first watermark indicating a first data item in the delivery queue that is to be retrieved next;
receiving a request for data from the document processing system;
attempting to decode, from the request for data, a limit on an amount of response data that is to be provided and the first watermark;
responsive to a retry request for the first labels, adjusting the delivery queue to indicate the first labels are pending for delivery based on a time in the retry request;
retrieving, from the delivery queue, and based on the first watermark decoded from the request for data, a number of labels consistent with the limit on response data;
determining, based on the number of labels, a second watermark of the delivery queue, the second watermark indicating a second data item in the delivery queue after the number of labels;
generating a first data response message to indicate the number of labels, a retrieved label, and the second watermark; and
transmitting the first data response message to the document processing system.

8. The method of claim 7, wherein the message further indicates whether additional data is available in the delivery queue.

9. The method of claim 7, further comprising:
receiving, from the document processing system, a request to re-queue the retrieved label for delivery; and
adjusting the delivery queue to indicate the retrieved label is pending for delivery.

10. A system, comprising:
hardware processing circuitry;
one or more hardware memories storing instructions that when executed configure the hardware processing circuitry to perform operations comprising:
responsive to a read request, fetching, from a document processing system, a document;
determining a label of the document, the label indicating a sensitivity level of the document;
storing the label in metadata of the document;
storing, in a delivery queue, indications of the label;
detecting a transition of a state of the delivery queue from empty to not empty;
notifying, in response to the detecting, the document processing system that the label is available, the notifying further indicating a first watermark of the delivery queue, the first watermark indicating a first data item in a delivery queue that is to be retrieved;
receiving a request for data from the document processing system;
attempting to decode, from the request for data, a limit on an amount of response data that is to be provided and the first watermark;
responsive to a retry request for the first labels, adjusting the delivery queue to indicate the first labels are pending for delivery based on a time in the retry request;
retrieving, from the delivery queue, and based on the first watermark decoded from the request for data, a number of labels consistent with the limit on response data;
determining, based on the number of labels, a second watermark of the delivery queue, the second watermark indicating a second data item in the delivery queue immediately after the number of labels;
generating a first data response message to indicate the number of labels, a retrieved label, and the second watermark; and
transmitting the first data response message to the document processing system.

11. The system of claim 10, the operations further comprising:
receiving, from the document processing system, a request to re-queue the retrieved label for delivery; and
adjusting the delivery queue to indicate the retrieved label is pending for delivery.

12. The system of claim 11, the operations further comprising:
decoding, from the request to re-queue the retrieved label, an indication of a delay before delivery of the retrieved label; and
inhibiting delivery of the retrieved label until a time consistent with the indication of the delay in response to the decoding of the request to re-queue the retrieved label.

13. The system of claim 12, the operations further comprising inhibiting an indication that the retrieved label is available for delivery until the time consistent with the indication.

14. The system of claim 12, the operations further comprising:
receiving a data request from the document processing system;
decoding, from the data request, a response data limit and the second watermark;
second retrieving, based on the second watermark and the response data limit, a second label from the delivery queue;
determining, based on the second retrieving, a third watermark;
generating a second data response message to include the second label and the third watermark; and
transmitting the second data response message to the document processing system.

15. The system of claim 10, wherein the message further indicates whether additional data is available in the delivery queue.

16. A non-transitory computer readable storage medium comprising instructions that when executed configure hardware processing circuitry to perform operations comprising:
responsive to a read request, fetching, from a document processing system, a document;

determining a label of the document, the label indicating a sensitivity level of the document;

storing the label in metadata of the document;

storing, in a delivery queue, indications of the label;

detecting a transition of a state of the delivery queue from empty to not empty;

notifying, in response to the detecting, the document processing system that the label is available, the notifying further indicating a first watermark of the delivery queue, the first watermark indicating a first data item in the delivery queue that is to be retrieved next;

receiving a request for data from the document processing system;

attempting to decode, from the request for data, a limit on an amount of response data that is to be provided and the first watermark;

responsive to a retry request for the first labels, adjusting the delivery queue to indicate the first labels are pending for delivery based on a time in the retry request;

retrieving, from the delivery queue, and based on the first watermark decoded from the request for data, a number of labels consistent with the limit on response data;

determining, based on the number of labels, a second watermark of the delivery queue, the second watermark indicating a second data item in the delivery queue immediately after the first number of labels;

generating a first data response message to indicate the number of labels, a retrieved label, and the second watermark; and transmitting the first data response message to the document processing system.

17. The non-transitory computer readable storage medium of claim 16, wherein the message further indicates whether additional data is available in the delivery queue.

18. The non-transitory computer readable storage medium of claim 17, the operations further comprising:

decoding, from the request to re-queue the retrieved label, an indication of a delay before delivery of the retrieved label; and inhibiting delivery of the retrieved label until a time consistent with the indication of the delay in response to the decoding of the request to re-queue the retrieved label.

19. The non-transitory computer readable storage medium of claim 18, the operations further comprising inhibiting an indication that the retrieved label is available for delivery until the time consistent with the indication.

20. The non-transitory computer readable storage medium of claim 16, the operations further comprising:

receiving, from the document processing system, a request to re-queue the retrieved label for delivery; and adjusting the delivery queue to indicate the retrieved label is pending for delivery.

* * * * *